US010908640B2

(12) United States Patent
Yamazaki

(10) Patent No.: US 10,908,640 B2
(45) Date of Patent: Feb. 2, 2021

(54) ELECTRONIC DEVICE

(71) Applicant: SEMICONDUCTOR ENERGY LABORATORY CO., LTD., Atsugi (JP)

(72) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 16/444,112

(22) Filed: Jun. 18, 2019

(65) Prior Publication Data

US 2019/0302835 A1 Oct. 3, 2019

Related U.S. Application Data

(63) Continuation of application No. 14/537,073, filed on Nov. 10, 2014, now abandoned.

(30) Foreign Application Priority Data

Nov. 15, 2013 (JP) ................................ 2013-237417
Dec. 2, 2013 (JP) ................................ 2013-249047

(51) Int. Cl.
*G06F 1/16* (2006.01)

(52) U.S. Cl.
CPC ............ *G06F 1/163* (2013.01); *G06F 1/1635* (2013.01); *G06F 1/1641* (2013.01); *G06F 1/1652* (2013.01)

(58) Field of Classification Search
CPC ...... G06F 1/163; G06F 1/1641; G06F 1/1652; G06F 1/1635; H02J 17/00; H02J 7/025; H02J 50/20
See application file for complete search history.

(56) References Cited

U.S. PATENT DOCUMENTS 5,637,418 A * 6/1997 Brown ................ H01M 2/0207 429/127
6,408,072 B1 6/2002 Fernandez-Martinez
6,599,659 B1 7/2003 Endo et al.
6,621,766 B2 9/2003 Brewer et al.
(Continued)

FOREIGN PATENT DOCUMENTS

EP 1927904 A 6/2008
JP 58-197655 A 11/1983
(Continued)

*Primary Examiner* — Hung S. Bui
*Assistant Examiner* — Sagar Shrestha
(74) *Attorney, Agent, or Firm* — Nixon Peabody LLP; Jeffrey L. Costellia

(57) ABSTRACT

An arm-worn electronic device used while being worn on an arm is proposed. A novel device that includes a display portion having a curved surface, a secondary battery having a curved surface, and a member for being worn on a user's upper arm so that the display portion and the secondary battery are worn on the user's upper arm. Part of the display portion overlaps with the secondary battery. The novel device is useful for workers in the manufacturing industry and the distribution industry, police officers, fire fighters, health workers, care workers, sales people who work with their hands when it is worn on their arms. The novel device can also be used as military equipment or a wearable computer that assists a user who operates a vehicle or a plane, for the military's sake.

10 Claims, 25 Drawing Sheets

(56) References Cited

U.S. PATENT DOCUMENTS 6,664,005 B2 12/2003 Kezuka et al.
7,285,334 B1 10/2007 Yamashita et al.
7,348,095 B2 3/2008 Katsumoto et al.
7,518,959 B2 4/2009 Akaiwa et al.
7,764,046 B2 7/2010 Osada
7,944,172 B2 5/2011 Osada
8,192,863 B2 6/2012 Best et al.
8,432,018 B2 4/2013 Dozen et al.
8,678,958 B2 3/2014 Kuwabara
8,753,763 B2 6/2014 Kwon et al.
8,785,030 B2 7/2014 Ueda
8,802,261 B2 8/2014 Goh et al.
8,847,556 B2 9/2014 Osada
8,852,796 B2 10/2014 Kim
8,900,742 B2 12/2014 Ahn et al.
9,142,358 B2 9/2015 Kuriki
9,158,285 B2 10/2015 Vondle et al.
9,270,229 B2 2/2016 Osada
9,311,686 B2 4/2016 Roush et al.
9,401,525 B2 7/2016 Izumi
9,582,043 B2 2/2017 Hirakata
2002/0047952 A1 4/2002 Kawata
2002/0103014 A1 8/2002 Hutchison et al.
2004/0156270 A1 8/2004 Weng
2004/0209657 A1 10/2004 Ghassabian
2005/0088365 A1 4/2005 Yamazaki et al.
2005/0174302 A1 8/2005 Ishii
2006/0146654 A1 7/2006 Yeager
2006/0202618 A1 9/2006 Ishii et al.
2007/0190402 A1 8/2007 Kumeuchi et al.
2008/0002527 A1 1/2008 Ishii et al.
2008/0037374 A1 2/2008 Chu et al.
2008/0084657 A1 4/2008 Baba et al.
2008/0130421 A1 6/2008 Akaiwa et al.
2008/0131759 A1* 6/2008 Hosaka .............. H01M 2/1094 429/61
2008/0291225 A1 11/2008 Arneson
2010/0029327 A1 2/2010 Jee
2010/0099029 A1* 4/2010 Kinoshita ............ H01M 4/134 429/316
2010/0167123 A1 7/2010 Kim
2010/0285368 A1* 11/2010 Yamamoto .......... H01M 4/0421 429/231.95
2010/0308335 A1 12/2010 Kim et al.
2011/0097615 A1 4/2011 Goh et al.
2011/0187681 A1 8/2011 Kim et al.
2011/0294009 A1 12/2011 Kawakami et al.
2012/0040211 A1 2/2012 Murata et al.
2012/0064391 A1 3/2012 Fukaya et al.
2012/0107657 A1 5/2012 Kwon et al.
2012/0201104 A1 8/2012 Amenduni gresele
2012/0202101 A1 8/2012 Ueda
2013/0044215 A1* 2/2013 Rothkopf ................ G06F 1/163 348/143
2013/0101884 A1 4/2013 Ueda
2013/0110264 A1 5/2013 Weast et al.
2013/0122362 A1 5/2013 Sato et al.
2013/0134051 A1 5/2013 Takahashi et al.
2013/0154826 A1* 6/2013 Ratajczyk ........... H04M 19/047 340/539.11
2013/0154970 A1 6/2013 Seo et al.
2013/0172068 A1 7/2013 Zhou et al.
2013/0177798 A1 7/2013 Ueda
2013/0178248 A1 7/2013 Kim
2013/0222270 A1* 8/2013 Winkler ............. H04W 52/027 345/173
2013/0224562 A1 8/2013 Momo
2013/0235008 A1* 9/2013 Kwon ..................... G06F 1/163 345/204
2013/0252065 A1* 9/2013 Ueda ................. H01M 10/0436 429/127
2013/0252088 A1 9/2013 Kuriki et al.
2013/0252089 A1 9/2013 Kuriki
2013/0273405 A1 10/2013 Takahashi et al.
2013/0295431 A1 11/2013 Kwon et al.
2014/0057145 A1 2/2014 Goldstein et al.
2014/0193710 A1 7/2014 Hasegawa
2014/0253487 A1 9/2014 Bezinge et al.
2014/0367079 A1 12/2014 DiFulgentiz, III
2015/0010831 A1* 1/2015 Noguchi ............... H01M 4/502 429/330
2015/0037648 A1* 2/2015 Nguyen ............. H01M 10/625 429/120
2015/0056494 A1* 2/2015 Honda ................... H01G 11/52 429/145
2015/0099161 A1 4/2015 Hitotsuyanagi et al.
2015/0111088 A1 4/2015 Hiroki et al.
2015/0140396 A1 5/2015 Yamazaki
2015/0140398 A1 5/2015 Yamazaki
2015/0155530 A1 6/2015 Takahashi et al.
2015/0171468 A1* 6/2015 Sasaki .................. H01M 4/505 429/188
2015/0171477 A1* 6/2015 Takahashi ............. H01M 4/505 429/326
2015/0242083 A1 8/2015 Rainisto
2015/0325822 A1 11/2015 Ichikawa et al.

FOREIGN PATENT DOCUMENTS

JP 59-189554 A 10/1984
JP 07-006771 A 1/1995
JP 09-213377 A 8/1997
JP 09-274935 A 10/1997
JP 09-320637 A 12/1997
JP 10-326602 A 12/1998
JP 2000-173559 A 6/2000
JP 2000-315489 A 11/2000
JP 2001-093581 A 4/2001
JP 2001-102090 A 4/2001
JP 2002-063938 A 2/2002
JP 2002-151019 A 5/2002
JP 2002-528811 9/2002
JP 2003-257408 A 9/2003
JP 2005-129393 A 5/2005
JP 2005-157317 A 6/2005
JP 2005-332591 A 12/2005
JP 2006-509203 3/2006
JP 2006-331874 A 12/2006
JP 2007-066619 A 3/2007
JP 2007-234466 A 9/2007
JP 2008-139164 A 6/2008
JP 2009-016275 A 1/2009
JP 2009-187768 A 8/2009
JP 2010-135231 A 6/2010
JP 2010-232145 A 10/2010
JP 2011-129378 A 6/2011
JP 2012-113843 A 6/2012
JP 2012-142153 A 7/2012
JP 2013-048041 A 3/2013
JP 2013-048042 A 3/2013
WO WO-2000/025193 5/2000
WO WO-2012/140709 10/2012

* cited by examiner

FIG. 11A1
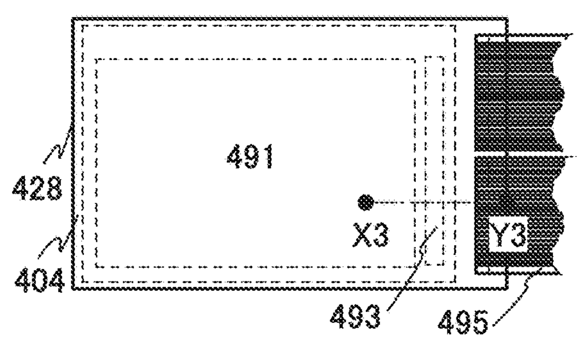
FIG. 11A2
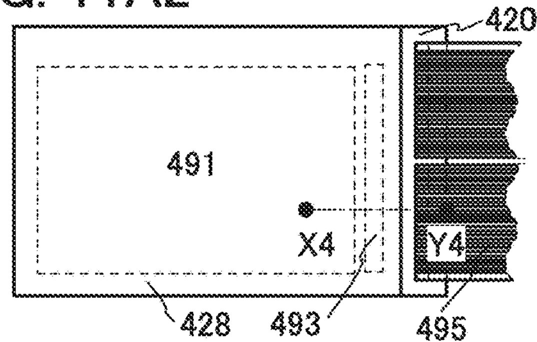
FIG. 11B
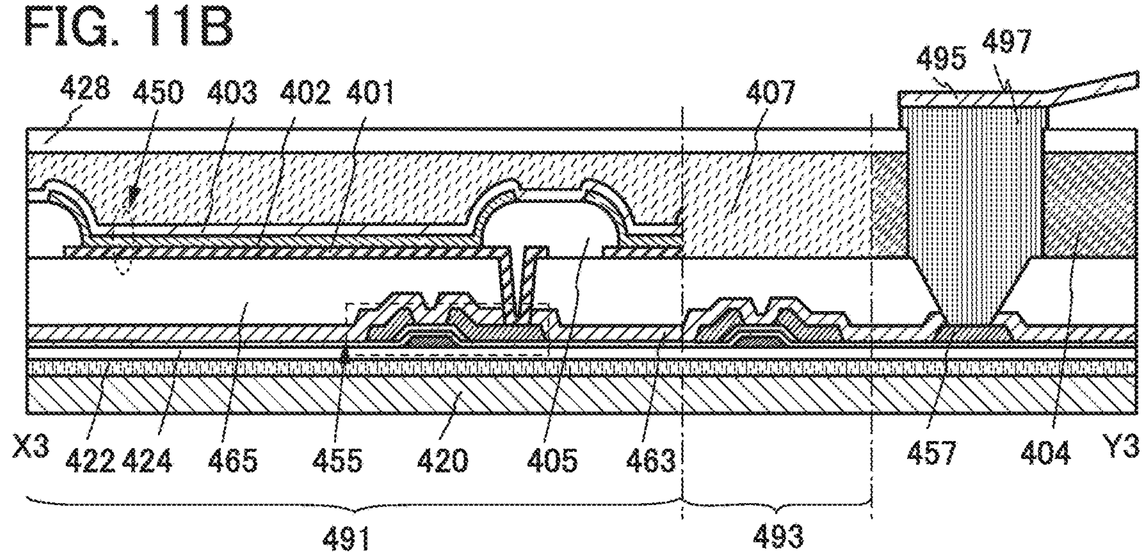
FIG. 11C
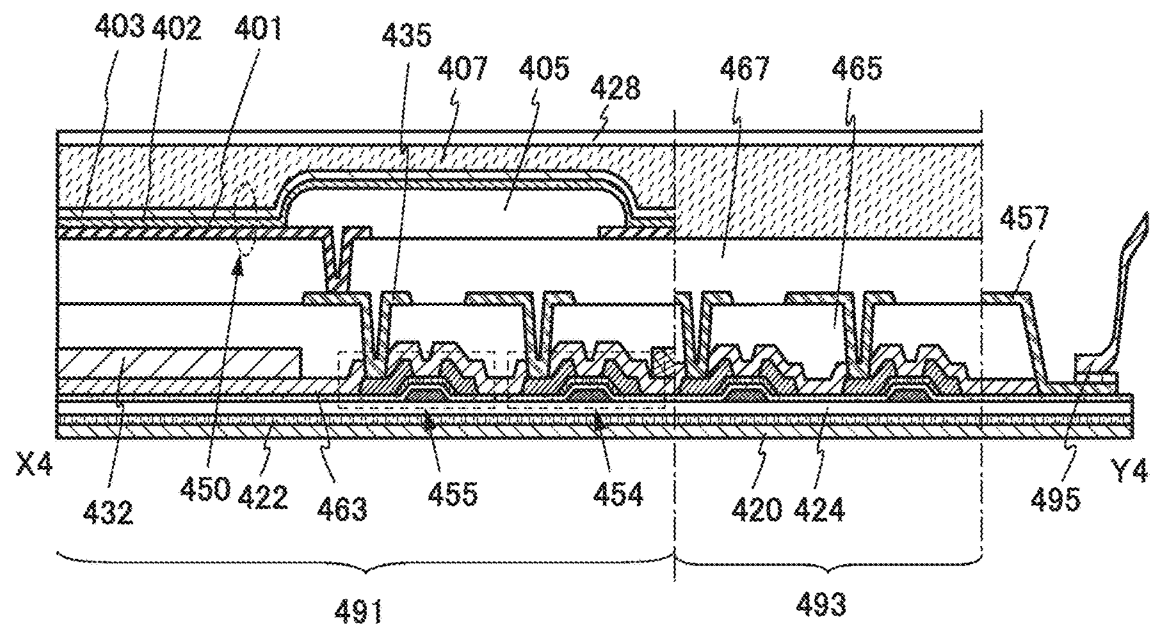

FIG. 13A1
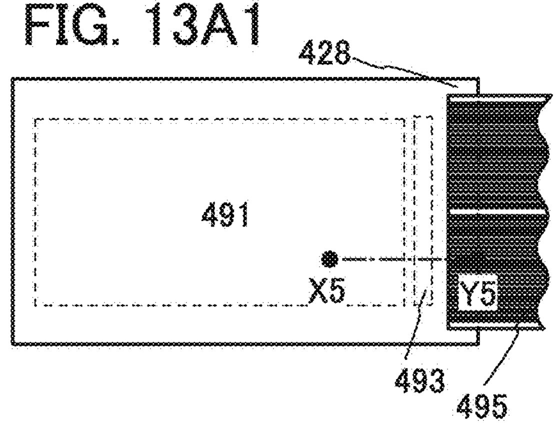
FIG. 13A2
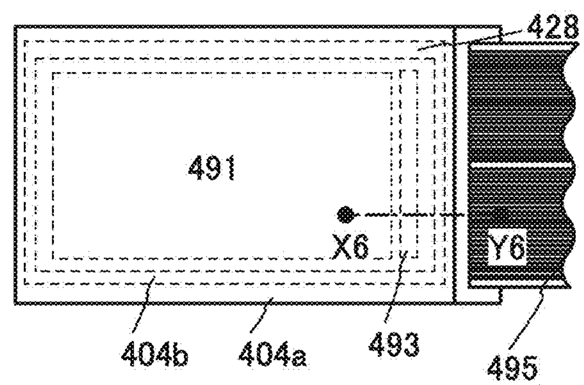
FIG. 13B
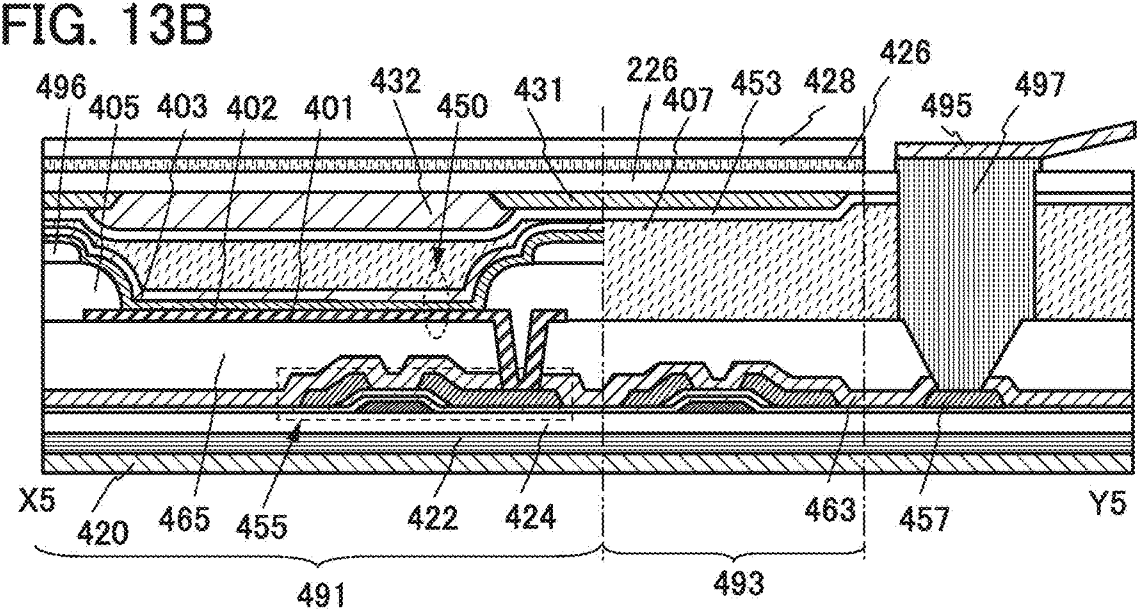
FIG. 13C
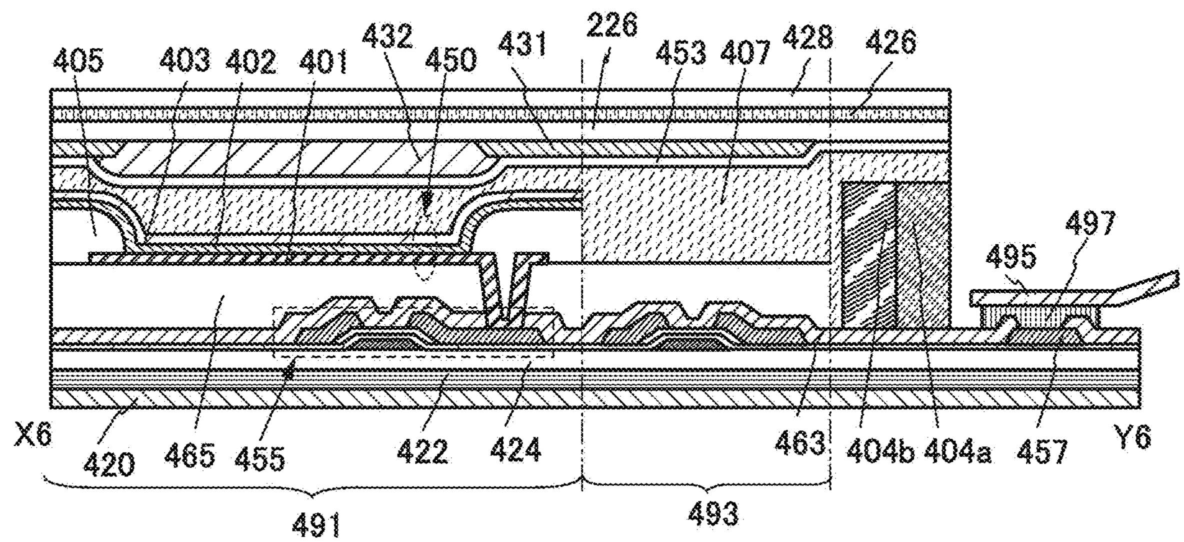

804
815
801
801b
802a
802
815
805
803
807

820
807
803
804
805

ELECTRONIC DEVICE

BACKGROUND OF THE INVENTION

1. Field of the Invention

One embodiment of the present invention relates to a secondary battery and an electronic device including the secondary battery.

Note that one embodiment of the present invention is not limited to the above technical field. The technical field of one embodiment of the invention disclosed in this specification and the like relates to an object, a method, or a manufacturing method.

One embodiment of the present invention relates to a process, a machine, manufacture, or a composition of matter. Specific examples of the technical field of one embodiment of the present invention disclosed in this specification include a semiconductor device, a display device, a light-emitting device, a lighting device, a power storage device, a storage device, a method for driving any of them, and a method for manufacturing any of them.

Note that electronic devices in this specification mean all devices including secondary batteries, and electro-optical devices including secondary batteries, information terminal devices including secondary batteries, vehicles including secondary batteries, and the like are all electronic devices.

2. Description of the Related Art

In recent years, portable information terminals typified by smartphones have been actively developed. Portable information terminals, which are a kind of electronic devices, are desired to be lightweight by users.

Wearable devices are in demand in the military market, the commercial market, and the like. Patent Document 1 discloses an example of a hands-free wearable device with which information can be visually obtained anywhere, specifically, goggle-type display device that includes a CPU and is capable of data communication. The device disclosed in Patent Document 1 is also a kind of electronic device.

Most wearable devices and portable information terminals include secondary batteries (also referred to as batteries) that can be repeatedly charged and discharged, and have problems in that there is a limitation on the time for operation of the wearable devices and the portable information terminals because their light weight and compactness limit the battery capacity. Secondary batteries used in wearable devices and portable information terminals should be lightweight and should be able to be used for a long time.

Examples of secondary batteries include a nickel-metal hydride battery and a lithium-ion secondary battery. In particular, lithium-ion secondary batteries have been actively researched and developed because the capacity thereof can be increased and the size thereof can be reduced.

REFERENCE

[Patent Document 1] Japanese Published Patent Application No. 2005-157317

SUMMARY OF THE INVENTION

In order that a user can comfortably wear a display device used while being worn on a human body, the display device needs to have light weight and compactness, and in addition, the whole electronic device including a driver device for the display device and a power source needs to have light weight.

An electronic device having a novel structure, specifically, an electronic device having a novel structure that can be changed in form in various ways is provided. More specifically, an arm-worn electronic device used while being worn on an arm is proposed. Furthermore, an arm-worn secondary battery used while being worn on an arm is proposed. Note that the descriptions of these objects do not disturb the existence of other objects. In one embodiment of the present invention, there is no need to achieve all the objects. Other objects will be apparent from and can be derived from the descriptions of the specification, the drawings, the claims, and the like.

A novel device includes at least a display having a curved surface and a bendable secondary battery. The novel device preferably further includes one or more functional elements. An example of a functional element is a sensor. As the sensor, a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. The novel device may include a functional element such as a touch panel, an antenna, a power generation element, and a speaker.

A novel device includes at least a driver circuit for displaying an image on a display screen, a circuit for charging a secondary battery with or without wires, and a protection circuit that prevents overcharge of the secondary battery and may further include a circuit for controlling or driving another functional element, specifically, an integrated circuit (e.g., a CPU).

The surface of the novel device that is exposed to the outside air is sealed with one or more films. The film has one or more of a surface protection property, a shape-memory property, an optical property, and a gas barrier property.

The film may have a layered structure of inorganic films or organic films. For example, an organic resin substrate provided with a protection film with an excellent gas barrier property can be called a gas barrier film.

As a display of the novel device, a display that can resist 100000-time bending performed with a radius of curvature of 5 mm is used. The novel device is worn on part of a body, for example, an arm while being bent with a radius of curvature in the range from 1 mm to 150 mm, preferably from 5 mm to 150 mm. When the display is bent and has an arc-shaped cross section, compressive stress is applied to a surface of the film on the side closer to the center of curvature and tensile stress is applied to a surface of the film on the side farther from the center of curvature. When the secondary battery is curved and has an arc-shaped cross section, compressive stress is applied to a surface of the film close to the center of curvature and tensile stress is applied to a surface of the film far from the center of curvature. Note that the center of curvature of the display having a curved surface when the novel device is worn on an arm is inside the arm or near a trunk of a body. An exterior body of a secondary battery is formed of one or two films. In the case of a secondary battery having a layered structure, a cross-sectional structure of the battery that is bent is surrounded by two curves of the film serving as the exterior body.

A novel device is a semiconductor device that includes a display portion having a curved surface with a radius of curvature of 1 mm to 150 mm inclusive, a secondary battery having a curved surface with a radius of curvature of 10 mm to 150 mm inclusive, and a member for being worn on a user's upper arm so that the display portion and the secondary battery are worn on the user's upper arm. Part of the display portion overlaps with the secondary battery.

In the case where a user wears the novel device on his or her arm, the novel device can be fixed with a band (e.g., a string, a wire, a net, and a belt) or a spring, for example. Examples of how to wear the novel device include putting it directly on the skin of an upper arm, putting it on clothes overlapping with an upper arm and fixing it, sewing it on a portion of clothes that overlaps with an upper arm, and attaching it with a hook and loop fastener typified by a Velcro fastener (registered trademark) provided on a portion of clothes that overlaps with an upper arm.

The novel device includes the display and the secondary battery between two films exposed to the outside air. Part of the display portion overlaps with the secondary battery, and the radius of curvature of the display portion is different from that of the secondary battery. The display has a smaller thickness than the secondary battery, specifically, a thickness of as small as 5 mm or less. In the case where the thickness of the display is small and the display and the secondary battery are stacked so as to be in contact with each other, the radius of curvature of the display portion can be substantially equal to that of the secondary battery.

A description is given of the radius of curvature of a surface with reference to FIGS. 6A to 6C. In FIG. 6A, on a plane 1701 along which a curved surface 1700 is cut, part of a curve 1702 forming the curved surface 1700, is approximate to an arc of a circle, and the radius of the circle is referred to as a radius of curvature 1703 and the center of the circle is referred to as a center of curvature 1704. FIG. 6B is a top view of the curved surface 1700. FIG. 6C is a cross-sectional view of the curved surface 1700 taken along the plane 1701. When a curved surface is cut along a plane, the radius of curvature of a curve, which is a form of the curved surface, depends on along which plane the curved surface is cut. When a curved surface is cut by a plane, the radius of curvature of a curve in a cross section differs depending on the angle between the curved surface and the plane or on the cut position, and the smallest radius of curvature is define as the radius of curvature of a surface in this specification and the like.

In the case of bending a secondary battery in which a component 1805 including electrodes and an electrolytic solution is sandwiched between two films as exterior bodies, a radius of curvature 1802 of a film 1801 close to a center of curvature 1800 of the secondary battery is smaller than a radius of curvature 1804 of a film 1803 far from the center of curvature 1800 (FIG. 7A). When the secondary battery is curved and has an arc-shaped cross section, compressive stress is applied to a surface of the film on the side closer to the center of curvature 1800 and tensile stress is applied to a surface of the film on the side farther from the center of curvature 1800 (FIG. 7B). However, by forming a pattern including projections or depressions on surfaces of the exterior bodies, the influence of a strain can be reduced to be acceptable even when compressive stress and tensile stress are applied. For this reason, the secondary battery can change its form such that the exterior body on the side closer to the center of curvature has a curvature radius greater than or equal to 10 mm, preferably greater than or equal to 30 mm.

Note that the cross-sectional shape of the secondary battery is not limited to a simple arc shape, and the cross section can be partly arc-shaped; for example, a shape illustrated in FIG. 7C, a wavy shape illustrated in FIG. 7D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 10 mm, preferably greater than or equal to 30 mm.

When a novel device 104 is provided with a film 600 and a strip-like leaf spring 621, which is made of a convex material (e.g., stainless steel) whose cross section has a curved shape, the novel device 104 can be worn on or removed from an arm in a moment. In this case, the novel device 104 is fixed in close contact with an arm skin or with clothes between it and an arm skin. By using the strip-like leaf spring 621, the novel device 104 can be a device in which the length of the band does not need to be adjusted and which does not depend on the circumference of an arm.

There are a variety of applications of the novel device. For example, when a user wears it on his or her arm and makes its display emit light at nighttime, traffic safety can be ensured. For another example, when a soldier or the like wears it on an upper arm, he or she can check a chief's command, which is received in real time and displayed on its display portion, while creeping. It is difficult for a soldier or a security guard to use a wireless device, a mobile phone, or a head-mounted device because he or she wears a helmet and has weapons or tools with hands in executing his or her duties. Thus, it is useful that a soldier or a security guard can wear it on his or her upper arm and operate it by, for example, voice input to an audio input portion such as a microphone even when his or her hands are full. The novel device may include a plurality of display portions. In that case, it is an electronic device that includes a first display portion having a curved surface with a radius of curvature of 1 mm to 150 mm inclusive, a second display portion having a curved surface with a radius of curvature of 1 mm to 150 mm inclusive, and a secondary battery with a radius of curvature of 10 mm to 150 mm inclusive. Part of the first display portion overlaps with the secondary battery, and part of the second display portion overlaps with the secondary battery.

The novel device can also be effectively used in the field of sports. For example, it is difficult for a marathoner to check the time on his or her watch without stopping swinging his or her arms. Stopping swinging his or her arms might disturb his or her rhythm, obstructing his or her run. However, wearing it on his or her upper arm enables checking the time without stopping swinging of his or her arm.

Furthermore, it can display other information (e.g., his or her position in a course or his or her health condition) on its display screen. It is more useful that it further has a function that allows an athlete to operate it by voice input or the like without using his or her hands, seek instructions from his or her coach by a communication function, and listen the directions output by voice output from an audio output portion such as a speaker or view the instructions displayed on its display screen.

For another example, when a construction crew or the like who wears a helmet wears the novel device and operates it, he or she can exchange information by communication to easily obtain the positional information of other crews so that he or she can work safely.

The novel device is not necessarily worn on part of a human body. It can be attached to a robot (e.g., a factory robot and a humanoid robot), a columnar object (e.g., a column of a building, a utility pole, and an indicator pole), a tool, or the like.

A novel device can be provided. The novel device is useful for workers in the manufacturing industry and the distribution industry, police officers, fire fighters, health workers, care workers, sales people who work with their hands when it is worn on their arms. For example, when a user makes the novel device display an image on its display portion and performs an input operation, he or she can obtain various pieces of information from the image. For another example, the novel device further having a telephone function or an internet communication function can also be used as a portable information terminal. For another example, the novel device further mounted with a CPU or the like can also be used as a computer.

The novel device can also be used as military equipment or a wearable computer that assists a user who operates a vehicle or a plane, for the military's sake. The novel device can be worn on part of space suits an astronaut wears for work in space or on space suits. It is needless to say that the novel device further having a communication function for communication and a GPS function, which allows, for example, positional information to be determined, is more convenient.

Note that the description of these effects does not disturb the existence of other effects. One embodiment of the present invention does not have to achieve all the objects listed above. Other effects will be apparent from and can be derived from the description of the specification, the drawings, the claims, and the like.

BRIEF DESCRIPTION OF THE DRAWINGS

In the accompanying drawings:

FIGS. 11A1 to 11C illustrate examples of light-emitting devices;

FIGS. 13A1 to 13C illustrate examples of light-emitting devices:

DETAILED DESCRIPTION OF THE INVENTION

Embodiments and examples of the present invention will be described below in detail with reference to the drawings. However, the present invention is not limited to the descriptions below, and it is easily understood by those skilled in the art that modes and details disclosed herein can be modified in various ways. Further, the present invention is not construed as being limited to the descriptions of the embodiments and the examples.

Note that in each drawing referred to in this specification, the size or the layer thickness of each component is exaggerated or a region of each component is omitted for clarity of the invention in some cases. Therefore, embodiments of the present invention are not limited to such a scale.

Note that ordinal numbers such as "first" and "second" in this specification and the like are used in order to avoid confusion among components and do not denote the priority or the order such as the order of steps or the stacking order. A term without an ordinal number in this specification and the like is provided with an ordinal number in a claim in some cases in order to avoid confusion among components.

Embodiment 1

Figure 1:
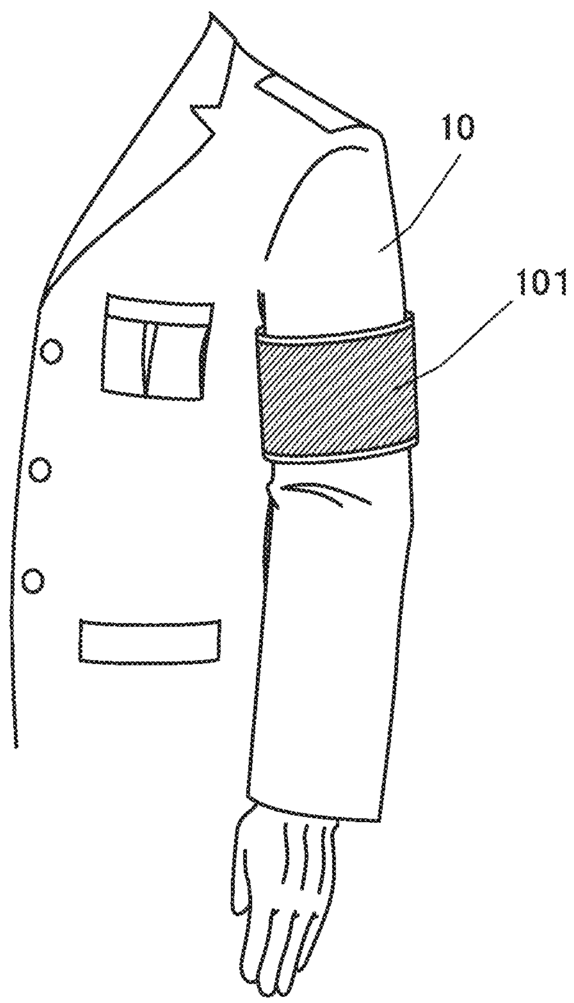
FIG. 1 is an external view illustrating an example where a novel device of one embodiment of the present invention is worn.

In this embodiment, an example of a novel device that can be worn on an upper arm will be described. FIG. 1 is a perspective view of the novel device that is worn on clothes.

As illustrated in FIG. 1, the novel device 101 is worn on a portion of clothes 10 that overlaps with a left upper arm. Examples of the clothes 10 include clothes with sleeves, such as a military uniform, an assault jacket, a suit jacket, a uniform, and space suits. There is no particular limitation on how to wear the novel device, and examples of ways to wear it include sewing it on a portion of clothes that overlaps with an upper arm, attaching it with a Velcro fastener (registered trademark) or the like provided on a portion of clothes that overlaps with an upper arm, fixing it with a band, a clasp, or the like, and winding a strip-like leaf spring around an upper arm.

Figure 2:
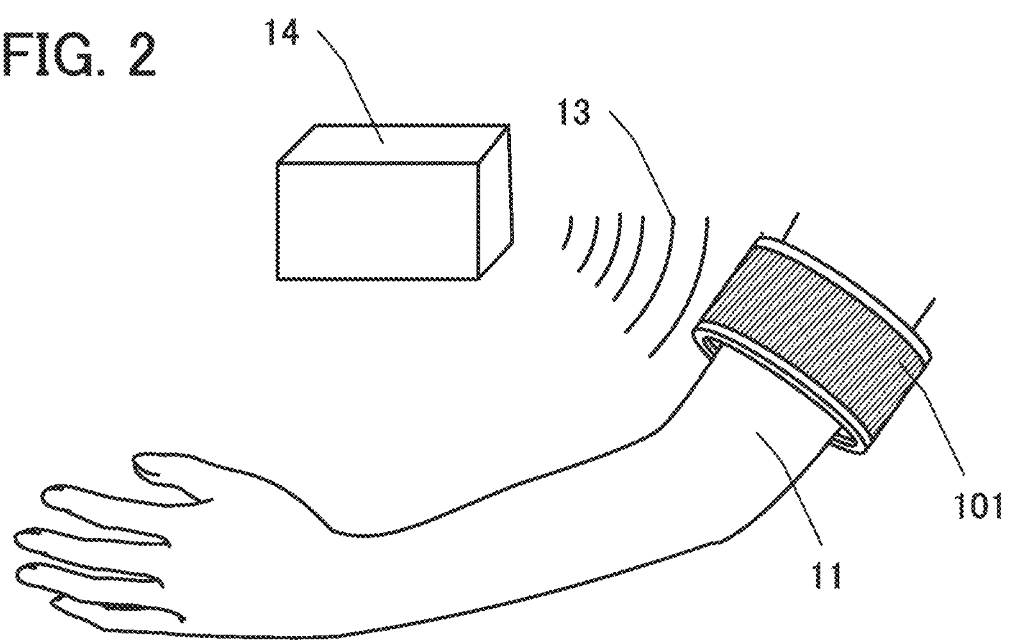
FIG. 2 is an external view illustrating an example where a novel device of one embodiment of the present invention is worn.

FIG. 2 is a perspective view illustrating the case where the novel device 101 is worn on a skin and wireless charging is performed. In FIG. 2, the novel device 101 is worn on an upper arm 11. A surface of the novel device 101 that is to be in contact with a skin is preferably formed using a skin-friendly film or a natural material such as leather, paper, and fabric. A reference numeral 14 denotes a power transmitting device with which the novel device 101 can be wirelessly charged by radio waves 13. When provided with an antenna or a circuit that can transmit and receive other data, the novel device can transmit and receive other data as well as power. For example, the novel device can also be used like a smartphone.

FIGS. 3A to 3F illustrate examples of forms of novel devices. Note that novel devices 101, 102, and 103 that are worn in contact with the upper arm 11; however, they are not necessarily worn in contact with the upper arm 11 and may be worn on clothes.

Figure 3A:
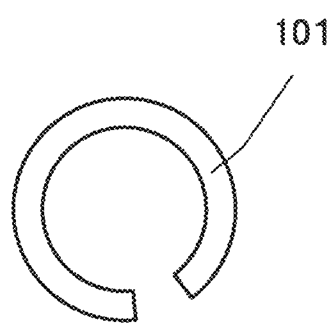
FIGS. 3A to 3F are cross-sectional views illustrating novel devices of embodiments of the present invention.
Figure 3B:
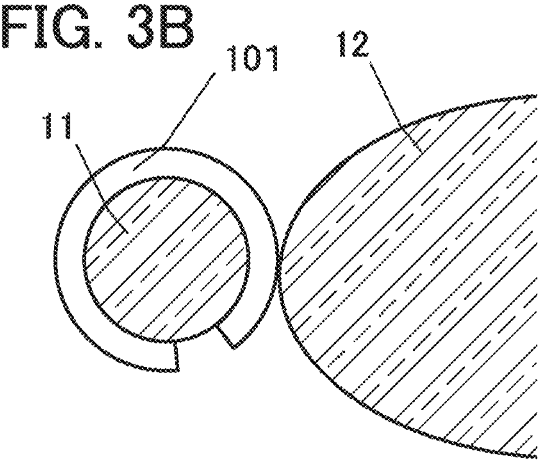

FIG. 3A is a cross-sectional view of the novel device 101 cut along the horizontal direction with a display portion located on a side surface of the novel device. FIG. 3B is a schematic cross-sectional view illustrating the novel device 101 worn on the left upper arm 11 and a trunk 12. The novel device 101 can be worn on the left upper arm 11 by fixing one end portion of the novel device to the other end portion thereof with a band, a Velcro fastener (registered trademark), or the like.

Figure 3C:
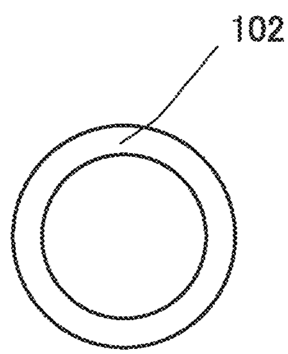
Figure 3D:
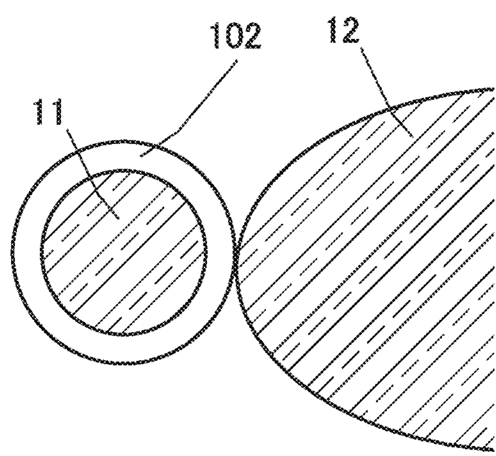

FIG. 3C illustrates an example of the novel device 102 a housing of which has a ring form or a cylindrical form. FIG. 3D is a schematic cross-sectional view illustrating the novel device 102 worn on the left upper arm 11 and the trunk 12. In this case, although the novel device 102 may be designed so as to fit the form of the upper arm 11, this might limit the movement of a user. That is why it is preferred that a hinge or the like be provided for the housing and the novel device be fixed with a clasp or the like.

Figure 3E:
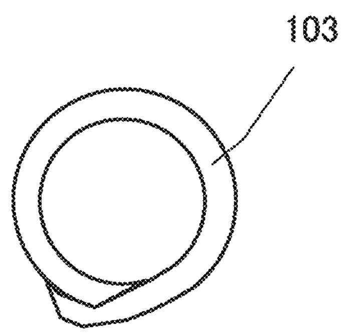
Figure 3F:
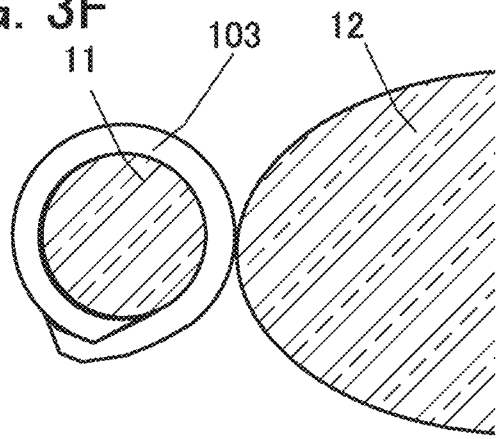
Figure 25A:
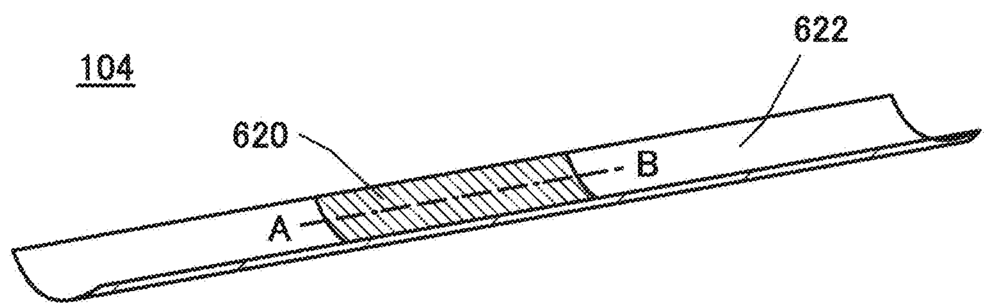
FIG. 25A is a perspective view of a novel device of one embodiment of the present invention.
Figure 25B:
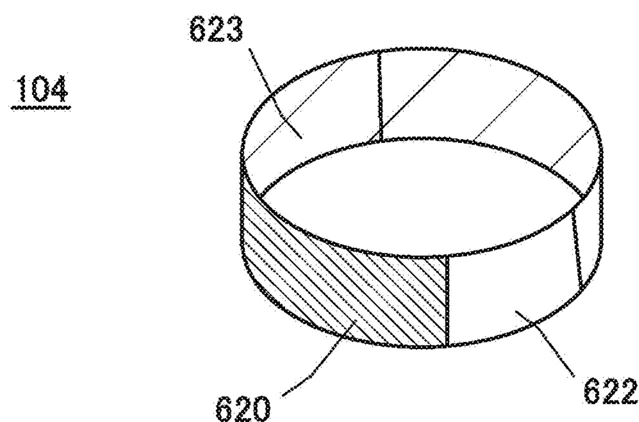
FIG. 25B is a perspective view of the novel device that is rolled.
Figure 25C:
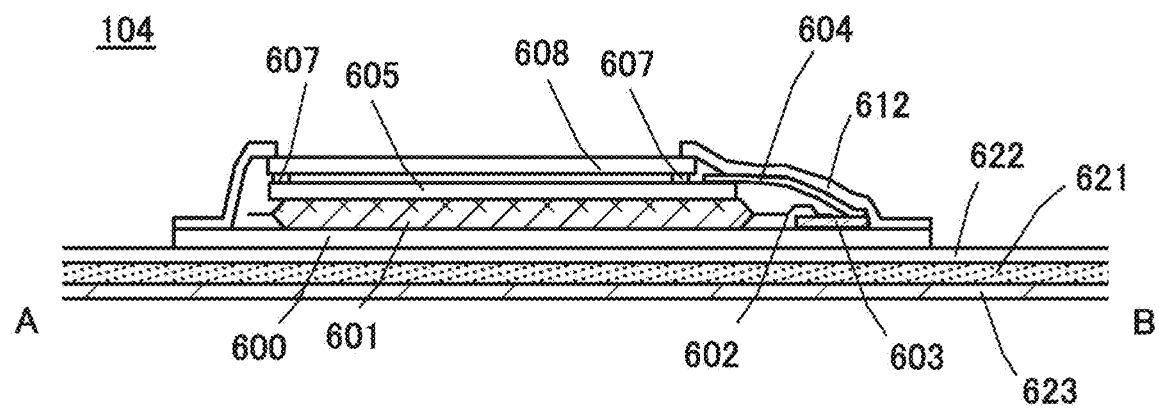
FIG. 25C is a cross-sectional view of the novel device.

FIG. 3E illustrates an example of the novel device 103 using a strip-like leaf spring. In this case, one end portion of the novel device overlaps with the other end portion thereof. FIG. 3F is a schematic cross-sectional view illustrating the novel device 103 worn on the left upper arm 11 and the trunk 12. The novel device 103 is fixed with the strip-like leaf spring so as to be wound around the left upper arm 11. The use of the strip-like leaf spring enables a user to wear or remove the novel device on or from his or her arm in a moment. The novel device can also be used in the state where the strip-like leaf spring is rolled out as illustrated in FIG. 25A. The novel device in that case is the novel device 104 including a display portion 620 having a surface slightly curved in the width direction. For example, when the surface of the novel device (a surface of a film 622) is lightly pushed, the novel device is rolled to have a bracelet-like form and transformed into the novel device 104 including the display portion 620 having a surface curved in the length direction as illustrated in FIG. 25B. As to the internal structure of the novel device 104, a film 623, the strip-like leaf spring 621, and a film 622 are provided in this order from the side in contact with an arm and the film 600 is fixed to the film 622 with a bonding layer (not illustrated) or the like as illustrated in FIG. 25C.

Figure 4A:
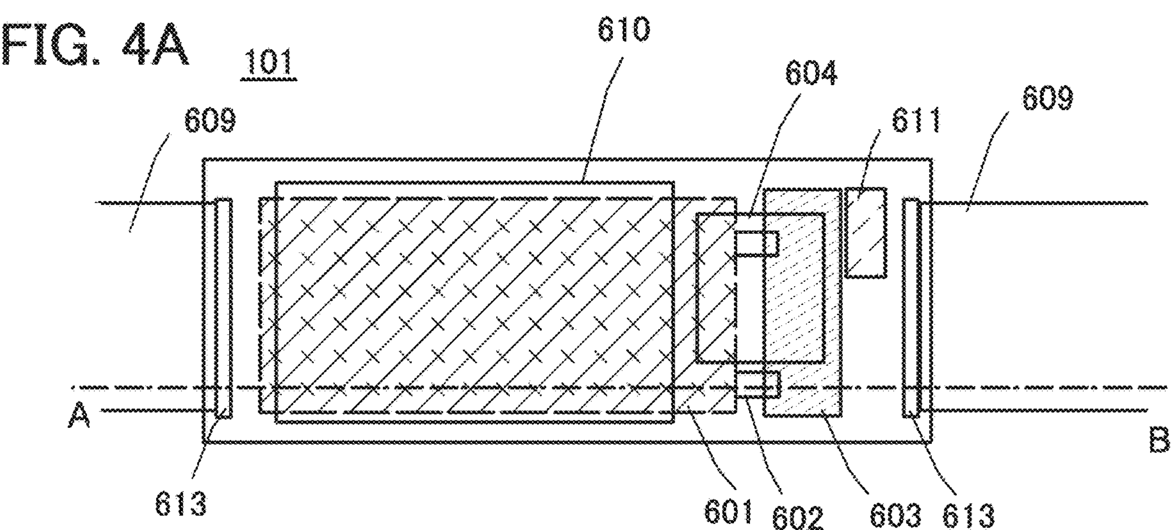
FIGS. 4A and 4B are a schematic view and a cross-sectional view illustrating a novel device of one embodiment of the present invention before worn.
Figure 4B:
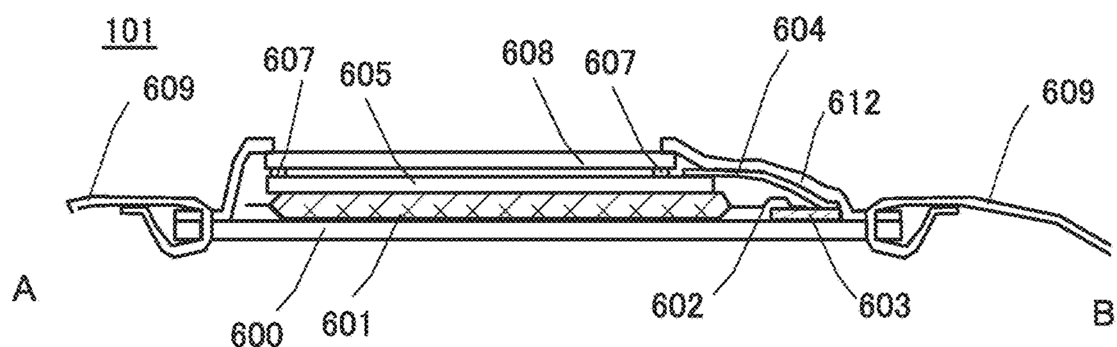

FIG. 4A is an example of a plan view illustrating the novel device 101 in FIG. 3A that is not bent. FIG. 4B is a cross-sectional view taken along chain line A-B in FIG. 4A.

Note that FIG. 4A is a schematic view illustrating only a minimal portion, and there is no particular limitation on arrangement, kinds, and the like of components.

The novel device 101 includes a display panel including an FPC 604 and a secondary battery module. The display panel includes a film 605 where light-emitting elements are arranged in a matrix, a sealing film 608, a sealant 607 for fixing the film 605 and the sealing film 608, and the FPC 604 electrically connected to a terminal portion. The film 605 and the sealing film 608 are each formed using a film material containing a flexible resin, and the display panel is lightweight and flexible. The display panel can have a curved surface with a radius of curvature of 1 mm to 150 mm inclusive by being bent. The sealing film 608 transmits light from the light-emitting elements and thus is preferably formed using an aramid resin with an excellent light-transmitting property.

The secondary battery module includes a flexible secondary battery 601 and a terminal (also referred to as an electrode tab) 602 of the secondary battery. The flexible secondary battery 601 can have a curved surface with a radius of curvature of 10 mm to 150 mm inclusive by being bent. The flexible secondary battery 601 overlaps with the display panel. An image can be displayed in a display region 610.

When the novel device 101 is seen from the center of curvature of a curved surface of the novel device 101, the display panel is farther than the flexible secondary battery 601. Therefore, the radius of curvature of the flexible secondary battery 601 is smaller than that of the display panel in this embodiment. Note that the distance between the display panel and the flexible secondary battery 601 may be extended such that the radius of curvature of the flexible secondary battery 601 is substantially equal to that of the display panel.

The terminal 602 of the secondary battery module is electrically connected to a charging circuit mounted on a circuit board 603. The charging circuit includes an over-charge prevention circuit. The FPC of the display panel is electrically connected to a driver circuit mounted on the circuit board 603. The circuit board is provided with a power supply circuit, a video signal processing circuit, and the like as appropriate as well as the charging circuit and the driver circuit. The power supply circuit, the video signal processing circuit, and the like are provided so that an image can be displayed on the display panel using the secondary battery as a power source.

The novel device 101 further includes a transmission/reception circuit 611. The transmission/reception circuit 611 includes an antenna and an RF power feeding converter electrically connected to the terminal 602 of the secondary battery module. The transmission/reception circuit 611 enables power to be supplied from an antenna of a charger (not illustrated) to the novel device 101 such that the secondary battery 601 of the novel device 101 is charged.

Information such as the remaining battery level of the secondary battery 601 and the amount of time until charging is terminated can be displayed in the display region 610 of the novel device 101.

The transmission/reception circuit 611 may include a communication circuit, in which case image data and audio data can be transmitted and received.

The transmission/reception circuit 611 may further include a circuit having a GPS function to acquire the positional information of a user. GPS without a margin of error allows a user to obtain accurate positional information. For example, it is preferred that the position be measured by differential GPS or real time kinematic GPS. The positional information acquired by the transmission/reception circuit 611 can be displayed in the display region 610 of the novel device 101.

A protective film 612 is provided in a region except the display region 610 to shield the region except the display region 610. Note that a housing may be used to cover the region instead of the protective film 612. A band 609 is fixed with it passed through an opening 613 of the film 600. The novel device 101 can be worn when the band is fixed to an arm and the novel device 101 has a curved surface that fits a curved surface of the arm.

It is needless to say that a method for wearing the novel device is not limited to using a band. A designer of the novel device can appropriately select any of the following ways: putting it directly on the skin of an upper arm: putting it on clothes overlapping with an upper arm and fixing it; sewing it on a portion of clothes that overlaps with an upper arm; attaching it with, for example, a Velcro fastener (registered trademark) provided on a portion of clothes that overlaps with an upper arm; and putting it with the use of a strip-like leaf spring. For example, a strip-like leaf spring (a leaf spring that is rolled to have a bracelet-like form when a surface thereof is pushed lightly) is fixed so as to overlap with the lower side of the film 600 illustrated in FIG. 4A. In that case, an opening is not necessarily formed in the film 600. Note that the leaf spring 621 is covered with a cushioning (e.g., rubber, a film, and cloth) as in the example illustrated in FIG. 25C. In FIG. 25C, the leaf spring 621 is provided between the film 623 in contact with an upper arm and the film 622, and the film 600, the secondary battery 601, and the display panel are provided over the film 622 in this order. The film 600, the secondary battery 601, and the display panel are changed in their forms as the leaf spring 621 is changed in its form. The use of fiber-reinforced plastics (FRP) as a material of the leaf spring instead of stainless steel allows a reduction in weight. Alternatively, an appropriate way to wear the novel device can be selected by a user.

Embodiment 2

Figure 5A:
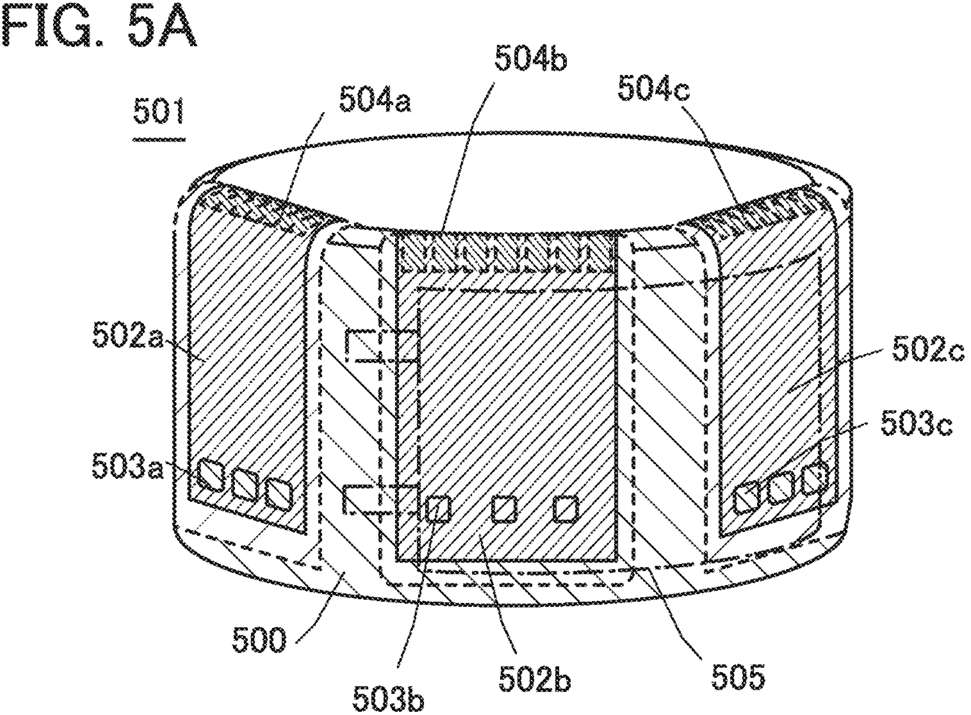
FIGS. 5A and 5B are external views illustrating an example of a novel device of one embodiment of the present invention.

FIG. 5A illustrates an example of a novel device that is different from that of Embodiment 1. In this embodiment, a novel device 501 including a plurality of display panels will be described below.

The novel device 501 illustrated in FIG. 5A is provided with three display panels and includes a plurality of display regions. Display surfaces of the three display panels are different, which allows a user to view the display surface of any one of the display panels over a wide range from the side surface. In other words, a user can conveniently use the novel device 501 without moving the novel device 501 around part of his or her body and accurately fixing the position where the novel device is worn.

In the case where a user wears the novel device 501 illustrated in FIG. 5A on his or her upper arm, not only display regions 502*a*, 502*b*, and 502*c* on the side surface of the novel device 501 but also display regions 504*a*, 504*b*, and 504*c* on the top surface of the novel device 501 can be viewed, and image data on the side surface or the top surface can be checked regardless of how he or she moves his or her arm. Thus, a user does not need to move his or her arm to view display of the novel device. This is useful in the case where a user's hands are full, and the user can view display in any of the display regions only by moving his or her neck or changing his or her viewpoint, regardless of what kind of work he or she is executing.

Only the top surface of each display panel may be curved. Part of the top surface has a radius of curvature of 1 mm to 20 mm inclusive.

Figure 5B:
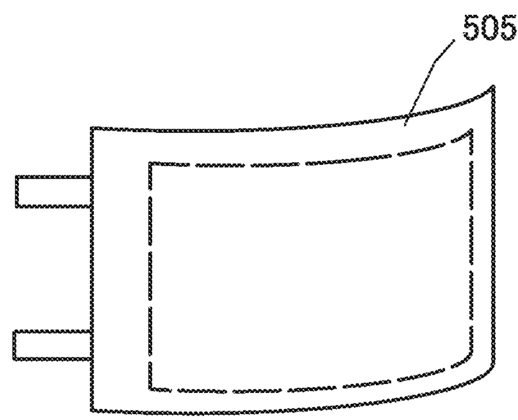
Figure 6A:
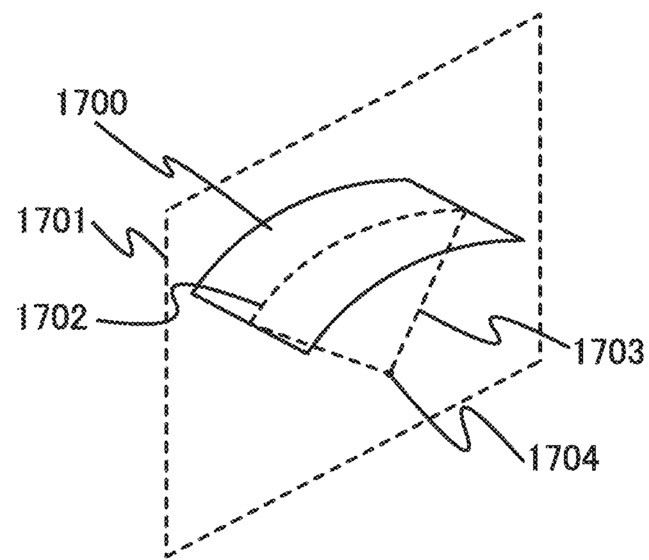
FIGS. 6A to 6C illustrate the radius of curvature of a surface.
Figure 6B:
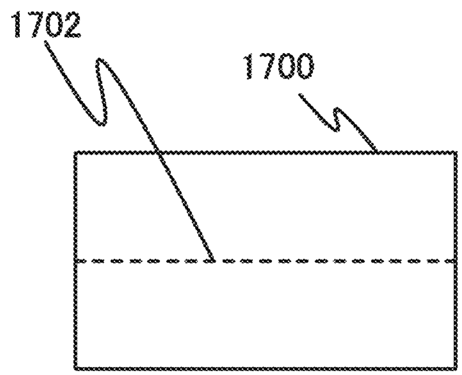
Figure 6C:
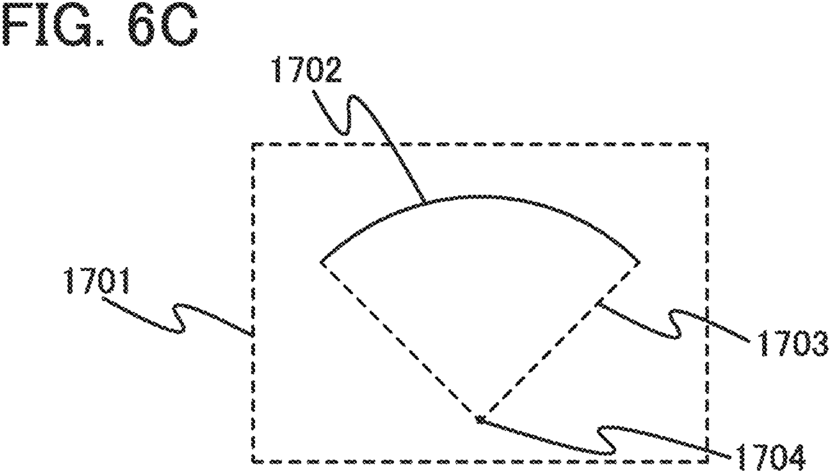
Figure 7A:
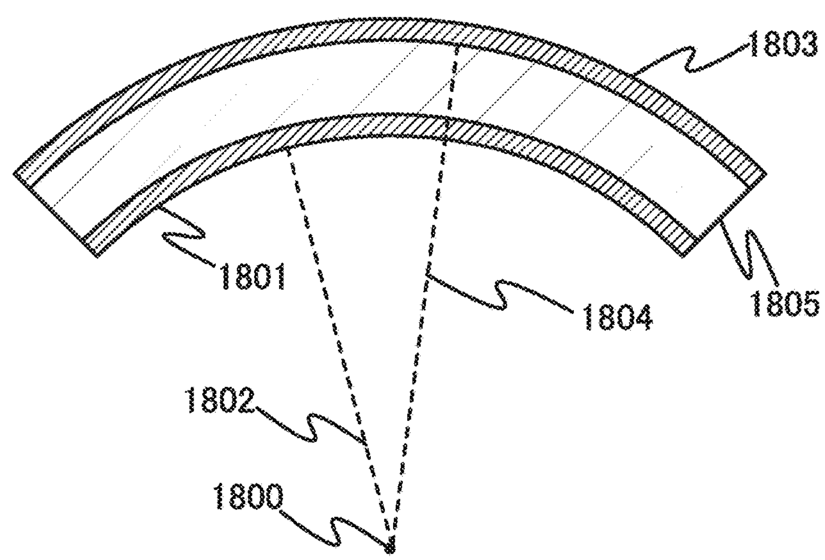
FIGS. 7A to 7D illustrate a center of curvature.
Figure 7B:
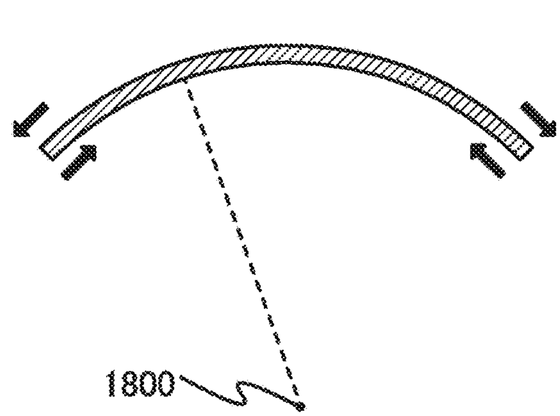
Figure 7C:
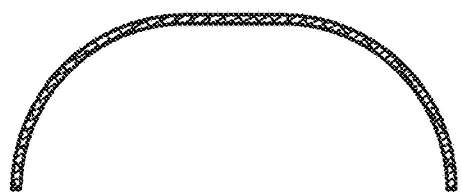
Figure 7D:
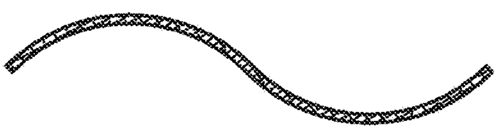

In FIG. 5A, a flexible secondary battery 505 is provided in a region surrounded by a dashed line. FIG. 5B illustrates only the flexible secondary battery 505. When the radius of curvature of the novel device 501 is 30 mm to 70 mm inclusive, that of the flexible secondary battery 505 is also preferably 30 mm to 70 mm inclusive. In this embodiment, the display panel has a smaller radius of curvature than the flexible secondary battery 505.

Although the flexible secondary battery 505 overlaps with two panels in FIG. 5A, one embodiment of the present invention is not particularly limited thereto.

Furthermore, the three display modules may each be provided with a touch panel. In FIG. 5A, touch panel input buttons 503*a*. 503*b*, and 503*c* are illustrated. In the case where the novel device 501 is worn on an upper arm and the touch panel input buttons 503*a*, 503*b*, and 503*c* are positioned near an armpit, malfunction might occur when an exposed portion of a trunk is in contact with or pushes the touch panel input buttons 503*a*, 503*b*, and 503*c*. Thus, the touch panel is preferably partly turned off.

The housing 500 may have or may not have flexibility as long as it can protect or shield the inside of the novel device 501. Even when the housing 500 is not flexible, the novel device 501 can have flexibility by including the plurality of display panels that are flexible.

In FIG. 5A, only the display panels and the flexible secondary battery 505 are illustrated in the housing 500, and other circuits, connections, and the like are not illustrated for simplicity. The housing 500 in FIG. 5A is provided with a driver circuit for displaying an image on a display screen, a circuit for charging the secondary battery with or without wires, a protective circuit for preventing overcharge of the secondary battery, an integrated circuit (e.g., a CPU) for controlling or driving other functional elements, a circuit having a GPS function, or a circuit having a telephone function.

The form of the novel device 501 is, but not limited to, a cylindrical form in this embodiment, and can have any of a variety of forms as described in Embodiment 1. The novel device 501 may have any size as long as the circumference of an opening through which an arm is passed is 200 mm to 450 mm inclusive. The novel device 501 with a radius of curvature of 30 mm to 70 mm inclusive has a size suitable for a human arm. Furthermore, an annular windbag may be provided between the housing 5(*t*) and an arm so that an internal space of the cylinder can be adjusted according to the size of the arm by the amount of air.

The number of the display panels of the novel device 501 is, but not limited to, three, and may be one, two, or four or more. In addition, the screen sizes of display panels may be the same or different.

Note that providing the plurality of display panels is advantageous because even if one of the display panels is broken, the other display panel can be individually used. Particularly in the case where the novel device provided with only one display panel is used in a dangerous region or space or for the military purpose, breakage of the display panel due to some reason makes the device hard to operate and thus a communication function and any other function cannot be used.

This embodiment can be freely combined with Embodiment 1.

Embodiment 3

In this embodiment, an example of fabricating a flexible display panel by a separating method will be described. In this embodiment, an example of fabricating the flexible display panel using a separation layer will be described below.

Figure 8A:
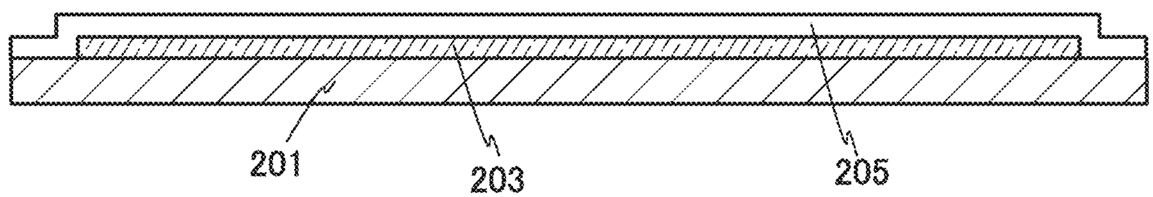
FIGS. 8A to 8D illustrate a separating method.
Figure 8B:
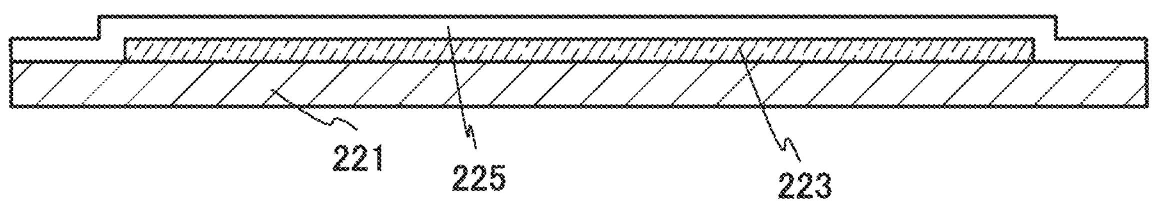

First, a separation layer 203 is formed over a formation substrate 201, and a layer 205 to be separated (hereinafter referred to as a layer 205) is formed over the separation layer 203 (FIG. 8A). In addition, a separation layer 223 is formed over a formation substrate 221, and a layer 225 to be separated (hereinafter referred to as a layer 225) is formed over the separation layer 223 (FIG. 8B).

As the formation substrate 201, a substrate having at least heat resistance high enough to withstand process temperature in a manufacturing process is used. For example, a glass substrate, a quartz substrate, a sapphire substrate, a semiconductor substrate, a ceramic substrate, a metal substrate, a resin substrate, or a plastic substrate can be used as the formation substrate 201.

Note that a large-sized glass substrate is preferably used as the formation substrate 201 in terms of productivity. For example, a glass substrate having any of the following sizes or a larger size can be used: the 3rd generation (550 mm×650 mm), the 3.5th generation (600 mm×720 mm or 620 mm×750 mm), the 4th generation (680 mm×880 mm or 730 mm×920 mm), the 5th generation (1100 mm×1300 mm), the 6th generation (1500 mm×1850 mm), the 7th generation (1870 mm×2200 mm), the 8th generation (2200 mm×2400 mm), the 9th generation (2400 mm×2800 mm or 2450 mm×3050 mm), and the 10th generation (2950 mm×3400 mm).

In the case where a glass substrate is used as the formation substrate 201, an insulating layer such as a silicon oxide film, a silicon oxynitride film, a silicon nitride film, or a silicon nitride oxide film is preferably formed as a base film between the formation substrate 201 and the separation layer 203 because the base film can function as an etching stopper to protect the glass substrate when a separation layer is selectively etched.

For example, when a tungsten film is used as the separation layer, a tungsten oxide film can be formed between a layer to be separated and the tungsten film by $N_2O$ plasma treatment. Forming the tungsten oxide film by $N_2O$ plasma treatment enables separation of the layer to be separated with a weak force. When the separation is caused at the interface between the tungsten film and the tungsten oxide film, the tungsten oxide film is left on the side of the layer to be separated in some cases. The left tungsten oxide film might adversely affect the properties of a transistor. Thus, a step of removing the left tungsten oxide film is preferably performed after the step of separating the separation layer and the layer to be separated.

In one embodiment of the present invention, a tungsten film with a thickness of greater than or equal to 0.1 nm and less than 200 nm is formed over the substrate. In this embodiment, a 30-nm-thick tungsten film is formed by a sputtering method.

Figure 8C:
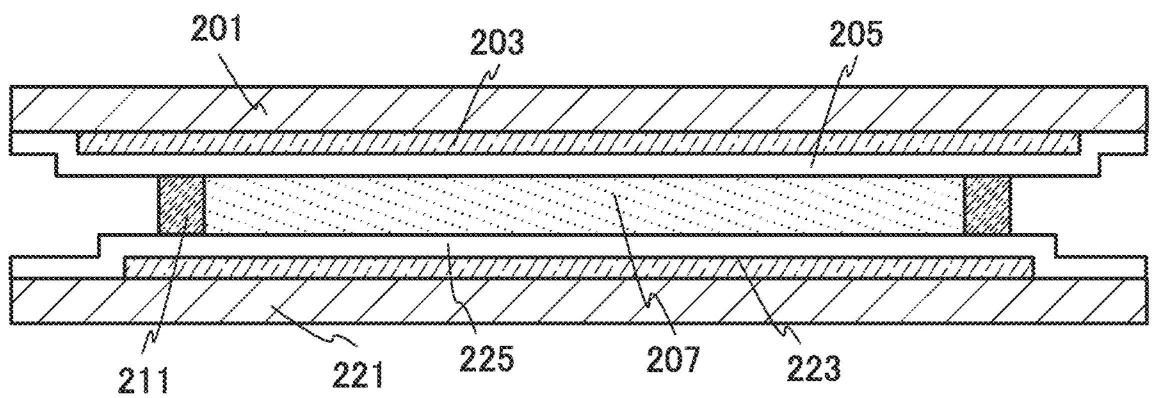

Next, the formation substrate 201 and the formation substrate 221 are attached to each other by using a bonding layer 207 and a frame-like bonding layer 211 so that the surfaces over which the layers to be separated are formed face each other, and then, the bonding layer 207 and the frame-like bonding layer 211 are cured (FIG. 8C). Here, the frame-like bonding layer 211 and the bonding layer 207 in a region surrounded by the frame-like bonding layer 211 are provided over the layer 225 and after that, the formation substrate 201 and the formation substrate 221 face each other and are attached to each other.

Note that the formation substrate 201 and the formation substrate 221 are preferably attached to each other in a reduced-pressure atmosphere.

Figure 8D:
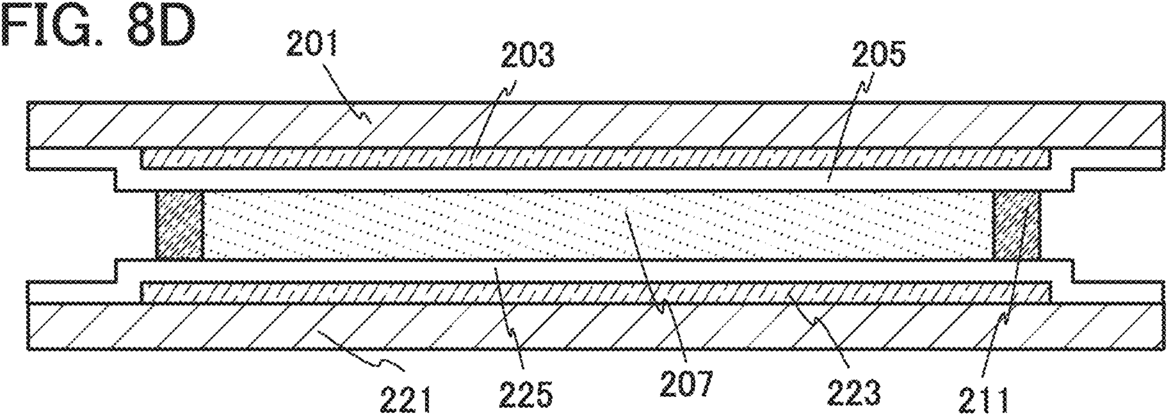

Note that although FIG. 8C illustrates the case where the separation layer 203 and the separation layer 223 are different in size, separation layers having the same size as illustrated in FIG. 8D may be used.

The bonding layer 207 is provided to overlap with the separation layer 203, the layer 205, the layer 225, and the separation layer 223. Then, edges of the bonding layer 207 are preferably positioned inside an area between at least edges of either the separation layer 203 or the separation layer 223 (the separation layer which is desirably separated first). Accordingly, strong adhesion between the formation substrate 201 and the formation substrate 221 can be suppressed; thus, a decrease in yield of a subsequent separating process can be suppressed.

Figure 9A:
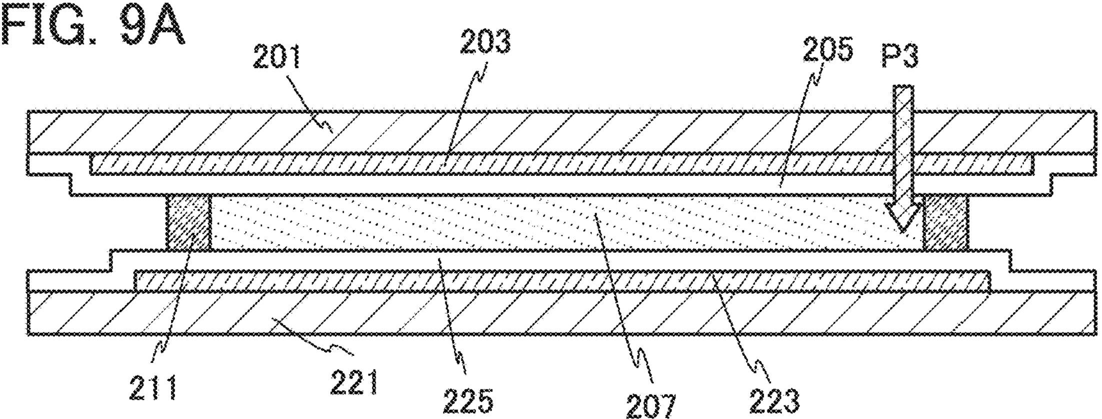
FIGS. 9A to 9D illustrate a separating method.
Figure 9B:
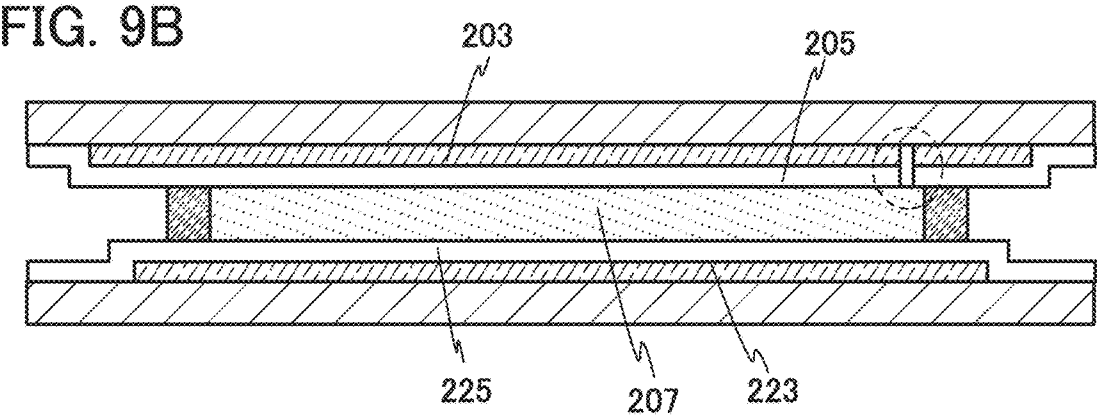

Next, a separation trigger is formed by laser irradiation (FIGS. 9A and 9B).

Either the formation substrate 201 or the formation substrate 221 may be separated first. In the case where the separation layers differ in size, a substrate over which a larger separation layer is formed may be separated first or a substrate over which a smaller separation layer is formed may be separated first. In the case where an element such as a semiconductor element, a light-emitting element, or a display element is formed only over one of the substrates, the substrate on the side where the element is formed may be separated first or the other substrate may be separated first. Here, the formation substrate 201 is separated first.

A region where the bonding layer 207 in a cured state or the frame-like bonding layer 211 in a cured state, the layer 205, and the separation layer 203 overlap with one another is irradiated with laser light. Here, the bonding layer 207 is in a cured state and the frame-like bonding layer 211 is not in a cured state, and the bonding layer 207 in a cured state is irradiated with laser light (see an arrow P3 in FIG. 9A).

Part of the layer 205 is removed; thus, the separation trigger can be formed (see a region surrounded by a dashed line in FIG. 9B). At this time, not only a part of the layer 205 but also the separation layer 203 or the bonding layer 207 may be partly removed.

It is preferred that laser light irradiation be performed from the side of the substrate provided with the separation layer that is desirably separated. In the case where a region where the separation layer 203 and the separation layer 223 overlap with each other is irradiated with laser light, the formation substrate 201 and the separation layer 203 can be selectively separated by cracking only the layer 205 of the layers 205 and 225 (see a region surrounded by a dotted line in FIG. 9B).

When a separation trigger is formed in both the layer 205 on the separation layer 203 side and the layer 225 on the separation layer 223 side in the case where the region where the separation layer 203 and the separation layer 223 overlap with each other is irradiated with laser light, it might be difficult to selectively separate one of the formation substrates. Therefore, laser light irradiation conditions are restricted so that only one of the layers to be separated is cracked, in some cases.

Figure 9C:
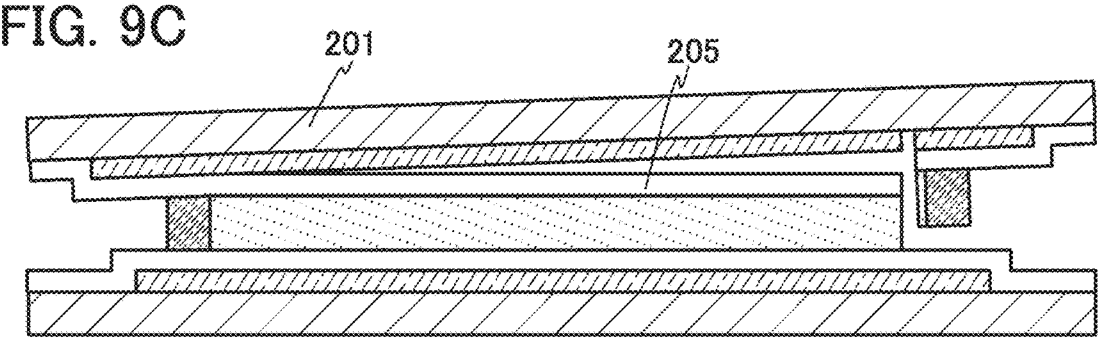
Figure 9D:
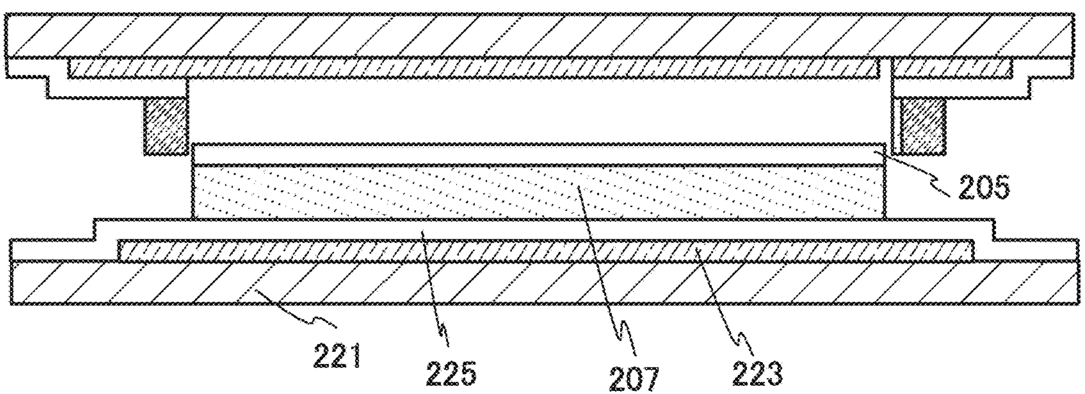

Then, the layer 205 and the formation substrate 201 are separated from each other from the formed separation trigger (FIGS. 9C and 9D). Consequently, the layer 205 can be transferred from the formation substrate 201 to the formation substrate 221.

Figure 10A:
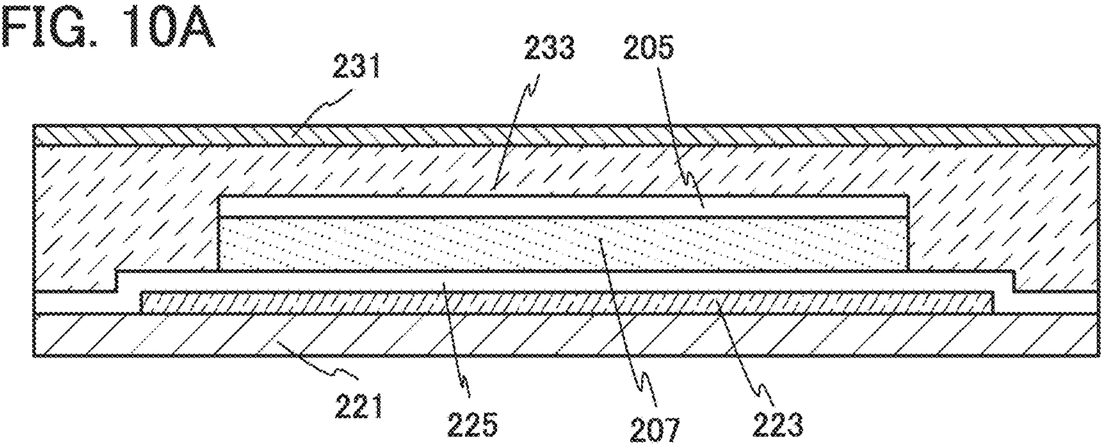
FIGS. 10A to 10D illustrate a separating method.

The layer 205 that is separated from the formation substrate 201 in the step in FIG. 9D is attached to a substrate 231 with a bonding layer 233, and the bonding layer 233 is cured (FIG. 10A).

Figure 10B:
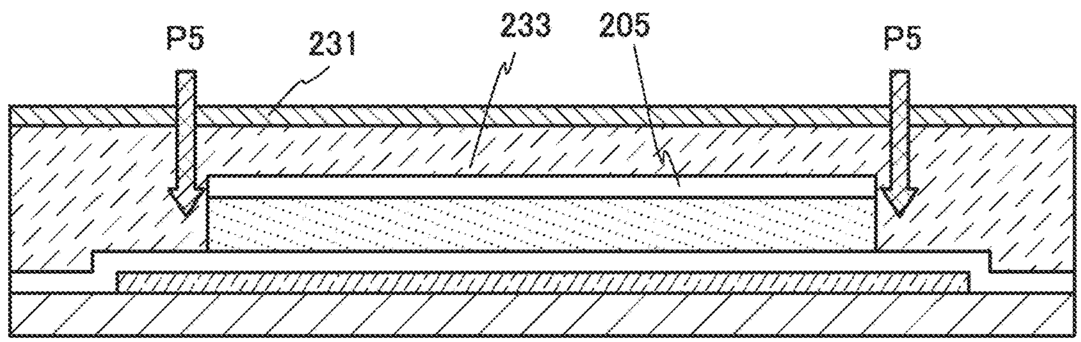
Figure 10C:
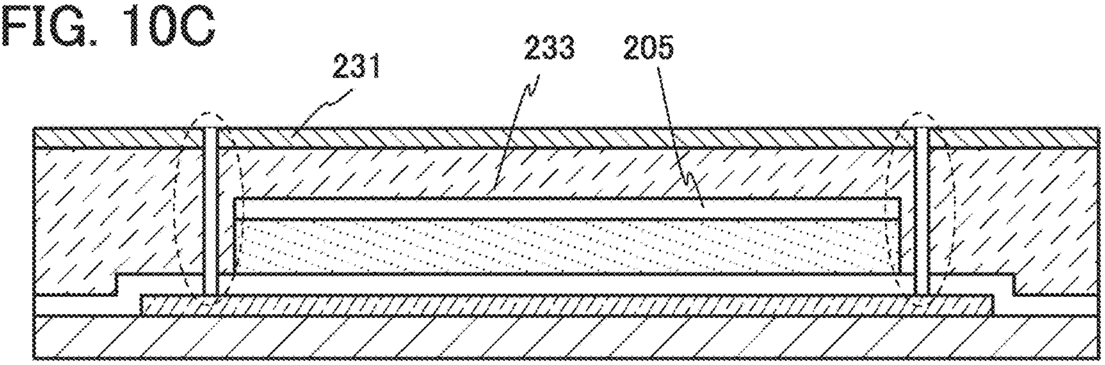

Next, a separation trigger is formed by a sharp knife such as a cutter (FIGS. 10B and 10C).

In the case where the substrate 231 on the side where the separation layer 223 is not provided can be cut by a knife or the like, a cut may be made in the substrate 231, the bonding layer 233, and the layer 225 (see arrows P5 in FIG. 10B). Consequently, part of the layer 225 can be removed; thus, the separation trigger can be formed (see a region surrounded by a dashed line in FIG. 10C).

For example, in the case where there is a region in which the formation substrate 221 and the substrate 231 are attached to each other using the bonding layer 233 without overlapping with the separation layer 223 as illustrated in FIGS. 10B and 10C, there is a portion in which the separation is not performed in a subsequent separating process depending on a degree of adhesion between the formation substrate 221 and the substrate 231, so that yield of the subsequent separating process might be decreased. Therefore, a cut is preferably made in a frame shape in a region where the bonding layer 233 in a cured state and the separation layer 223 overlap with each other to form a separation trigger in a form of a solid line. This can improve the yield of the separating process.

Figure 10D:
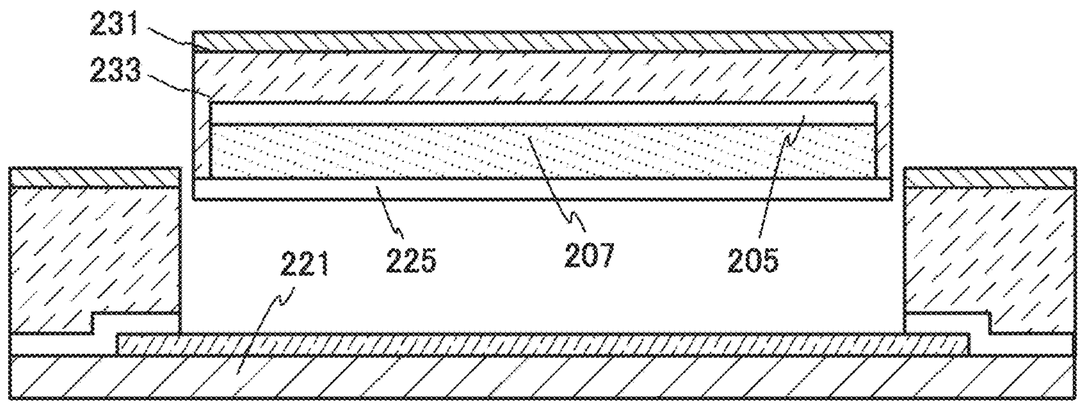

Then, the layer 225 and the formation substrate 221 are separated from each other from the formed separation trigger (FIG. 10D), so that the layer 225 can be transferred from the formation substrate 221 to the substrate 231.

The formation substrate 221 and the layer 225 may be separated from each other by filling the interface between the separation layer 223 and the layer 225 with a liquid such as water. A portion between the separation layer 223 and the layer 225 absorbs a liquid through a capillarity action, facilitating separation. Furthermore, an adverse effect on the functional element included in the layer 225 due to static electricity caused at separation (e.g., a phenomenon in which a semiconductor element is damaged by static electricity) can be suppressed. Note that a liquid may be sprayed in an atomized form or in a vaporized form. Examples of liquid include pure water, an organic solvent, a neutral solution, an alkali solution, an acid solution, and an aqueous solution in which a salt is dissolved.

In the separating method of one embodiment of the present invention described above, separation is performed in such a manner that a separation trigger is formed by a sharp knife or the like and then the interface between the separation layer and the layer to be separated is made in a separable state. This can improve the yield of the separating process.

In addition, bonding of a substrate included in a device that is desired to be fabricated can be performed after the following procedure: a pair of formation substrates each provided with a layer to be separated are attached to each other and then separation is performed. Therefore, formation substrates having low flexibility can be attached to each other when the layers to be separated are attached to each other, whereby alignment accuracy at the time of attachment can be improved compared to the case where flexible substrates are attached to each other.

An example of a flexible light-emitting device that can be fabricated using the separating method described above will be described below.

FIGS. 12A and 12B and FIGS. 13A1 to 13C illustrate examples of flexible light-emitting devices each including an organic EL element as a light-emitting element. The flexible light-emitting device of this embodiment can be bent in any direction with, for example, a radius of curvature of 1 mm to 150 mm inclusive. The number of bend portions may be one or more than one; for example, the light-emitting device can be bent in two or three.

For example, a light-emitting device of one embodiment of the present invention includes a first flexible substrate, a second flexible substrate, a light-emitting element between the first flexible substrate and the second flexible substrate, a first insulating layer between the first flexible substrate and the light-emitting element, and a first bonding layer between the second flexible substrate and the light-emitting element. The light-emitting element includes a layer containing a light-emitting organic compound between a pair of electrodes. The water vapor permeability of the first insulating layer is less than $1\times10^{-5}$ g/m$^2$·day.

The light-emitting device preferably further includes a second insulating layer between the second flexible substrate and the first bonding layer. The water vapor permeability of the second insulating layer is preferably less than $1\times10^{-5}$ g/m$^2$·day. The light-emitting device preferably further includes a second bonding layer that surrounds the first bonding layer like a frame.

Note that the light-emitting device in this specification includes, in its category, a display device using a light-emitting element. The category of the light-emitting device includes a module in which a light-emitting element is provided with a connector such as an anisotropic conductive film or a tape carrier package (TCP); a module in which a printed wiring board is provided at the end of a TCP; and a module in which an integrated circuit (IC) is directly mounted on a light-emitting element by a chip on glass (COG) method. Moreover, lighting equipment and the like may be included in the category of the light-emitting device.

Structural Example 1

FIG. 11A1 is a plan view of a light-emitting device, and FIG. 11B is a cross-sectional view along dashed-dotted line X3-Y3 in FIG. 11A1. The light-emitting device illustrated in FIG. 11B is a top-emission light-emitting device fabricated using a side-by-side method. In this embodiment, the light-emitting device can express one color with light-emitting units of three colors of red (R), green (G), and blue (B) or with light-emitting units of four colors of red (R), green (G), blue (B), and white (W), for example; however, colors other than R, G, and B, such as yellow, cyan, and magenta, may be used as color elements.

The light-emitting device illustrated in FIG. 11A1 includes a light-emitting portion 491 as the display portion, a driver circuit portion 493, and a flexible printed circuit (FPC) 495. An organic EL element and a transistor included in the light-emitting portion 491 and the driver circuit portion 493 are sealed by a flexible substrate 420, a flexible substrate 428, a frame-like bonding layer 404, and a bonding layer 407. FIG. 11B illustrates an example where the conductive layer 457 and the connector 497 are connected to each other through an opening portion of the frame-like bonding layer 404.

The light-emitting device illustrated in FIG. 11B includes the flexible substrate 420, a bonding layer 422, an insulating layer 424, a transistor 455, an insulating layer 463, an insulating layer 465, an insulating layer 405, an organic EL element 450 (a first electrode 401, an EL layer 402, and a second electrode 403), the frame-like bonding layer 404, the bonding layer 407, the flexible substrate 428, and the conductive layer 457. The flexible substrate 428, the bonding layer 407, and the second electrode 403 transmit visible light.

In the light-emitting portion 491 of the light-emitting device in FIG. 11B, the transistor 455 and the organic EL element 450 are provided over the flexible substrate 420 with the bonding layer 422 and the insulating layer 424 provided therebetween. The organic EL element 450 includes the first electrode 401 over the insulating layer 465, the EL layer 402 over the first electrode 401, and the second electrode 403 over the EL layer 402. The first electrode 401 is electrically connected to a source electrode or a drain electrode of the transistor 455. The first electrode 401 preferably reflects visible light. The end portion of the first electrode 401 is covered with the insulating layer 405.

The driver circuit portion 493 includes a plurality of transistors. FIG. 11B illustrates one of the transistors in the driver circuit portion 493.

The conductive layer 457 is electrically connected to an external input terminal through which a signal (e.g., a video signal, a clock signal, a start signal, and a reset signal) or a potential from the outside is transmitted to the driver circuit portion 493. Here, the FPC 495 is provided as the external input terminal.

To prevent an increase in the number of fabricating steps, the conductive layer 457 is preferably formed using the same material and the same step(s) as those of the electrode or the wiring in the light-emitting portion or the driver circuit portion. Here, the example is described in which the conductive layer 457 is formed using the same material and the same step(s) as those of the electrodes of the transistor.

The insulating layer 463 has an effect of inhibiting diffusion of impurities into a semiconductor included in the transistor. As the insulating layer 465, an insulating layer having a planarization function is preferably selected in order to reduce surface unevenness due to the transistor.

The frame-like bonding layer 404 preferably has a more excellent gas barrier property than the bonding layer 407, in which case moisture and oxygen from the outside can be prevented from entering the light-emitting device. Thus, the light-emitting device can be highly reliable.

In Structural Example 1, light emission of the organic EL element 450 is extracted from the light-emitting device through the bonding layer 407. For this reason, the bonding layer 407 preferably has a more excellent light-transmitting property than the frame-like bonding layer 404. Furthermore, the bonding layer 407 preferably has a higher refractive index than the frame-like bonding layer 404. In addition, it is preferred that the volume of the bonding layer 407 be less reduced by curing than that of the frame-like bonding layer 404.

The light-emitting device described in Structural Example 1 can be fabricated with high yield using the separating method described above. According to the separating method, the insulating layer 424 and the transistors are formed over the formation substrate, as the layer to be separated, whereby the insulating layer 424 and the transistors can be formed at high temperature. The use of the insulating layer 424 and the transistors formed at high temperature enables the light-emitting device to have high reliability. Note that the organic EL element 450 or the like may also be formed as the layer to be separated.

Structural Example 2

FIG. 11A2 is a plan view of the light-emitting device, and FIG. 11C is a cross-sectional view along dashed-dotted line X4-Y4 in FIG. 11A2. The light-emitting device illustrated in FIG. 11C is a bottom-emission light-emitting device using a color filter method.

The light-emitting device illustrated in FIG. 11C includes the flexible substrate 420, the bonding layer 422, the insulating layer 424, a transistor 454, the transistor 455, the insulating layer 463, the coloring layer 432, the insulating layer 465, a conductive layer 435, an insulating layer 467, the insulating layer 405, the organic EL element 450 (the first electrode 401, the EL layer 402, and the second electrode 403), the bonding layer 407, the flexible substrate 428, and the conductive layer 457. The flexible substrate 420, the bonding layer 422, the insulating layer 424, the insulating layer 463, the insulating layer 465, the insulating layer 467, and the first electrode 401 transmit visible light.

In the light-emitting portion 491 of the light-emitting device illustrated in FIG. 11C, the switching transistor 454, the current control transistor 455, and the organic EL element 450 are provided over the flexible substrate 420 with the bonding layer 422 and the insulating layer 424 provided therebetween. The organic EL element 450 includes the first electrode 401 over the insulating layer 467, the EL layer 402 over the first electrode 401, and the second electrode 403 over the EL layer 402. The first electrode 401 is electrically connected to the source electrode or the drain electrode of the transistor 455 through the conductive layer 435. The end portion of the first electrode 401 is covered with the insulating layer 405. It is preferred that the second electrode 403 reflect visible light. Moreover, the light-emitting device includes the coloring layer 432 over the insulating layer 463 so as to overlap with the organic EL element 450.

The driver circuit portion 493 includes a plurality of transistors. FIG. 11C illustrates two of the transistors in the driver circuit portion 493.

The conductive layer 457 is electrically connected to an external input terminal through which a signal or a potential from the outside is transmitted to the driver circuit portion 493. Here, the example in which the FPC 495 is provided as the external input terminal is described. Moreover, here, the example in which the conductive layer 457 is formed using the same material and the same step(s) as those of the conductive layer 435 is described.

The insulating layer 463 has an effect of suppressing diffusion of impurities into a semiconductor included in the transistor. As the insulating layer 465 and the insulating layer 467, an insulating layer having a planarization function is preferably selected in order to reduce surface unevenness due to the transistors and the wirings.

Figure 12A:
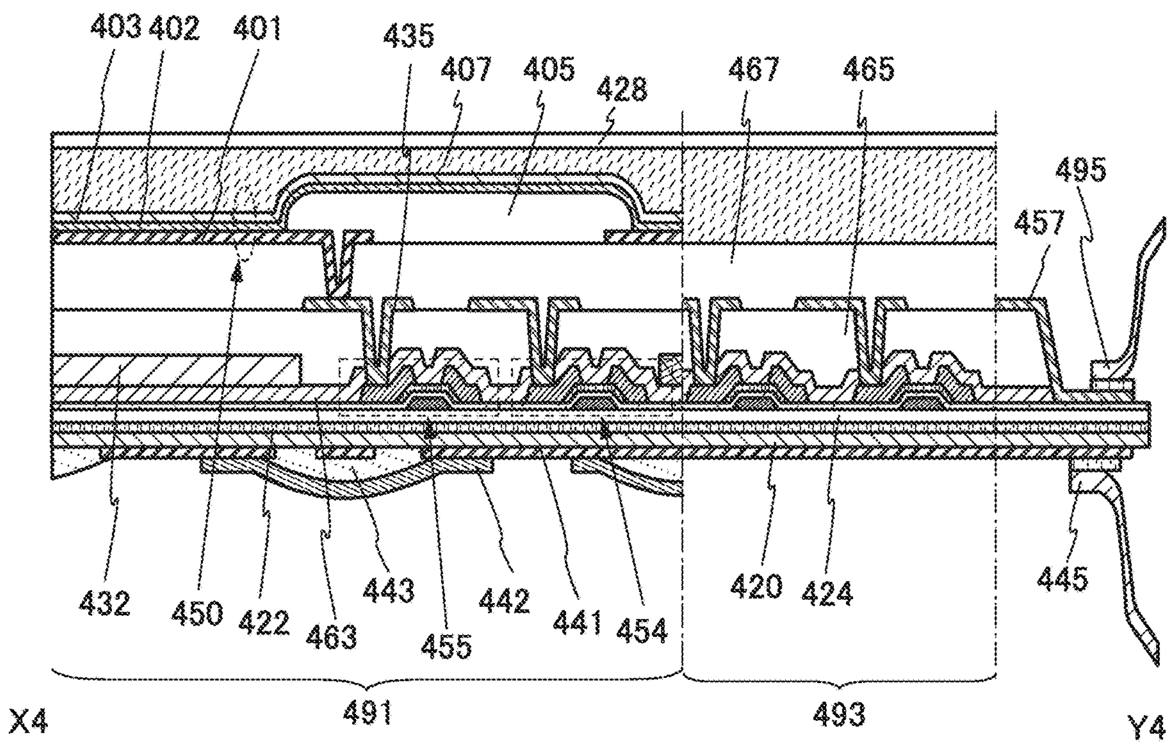
FIGS. 12A and 12B illustrate examples of light-emitting devices.
Figure 12B:
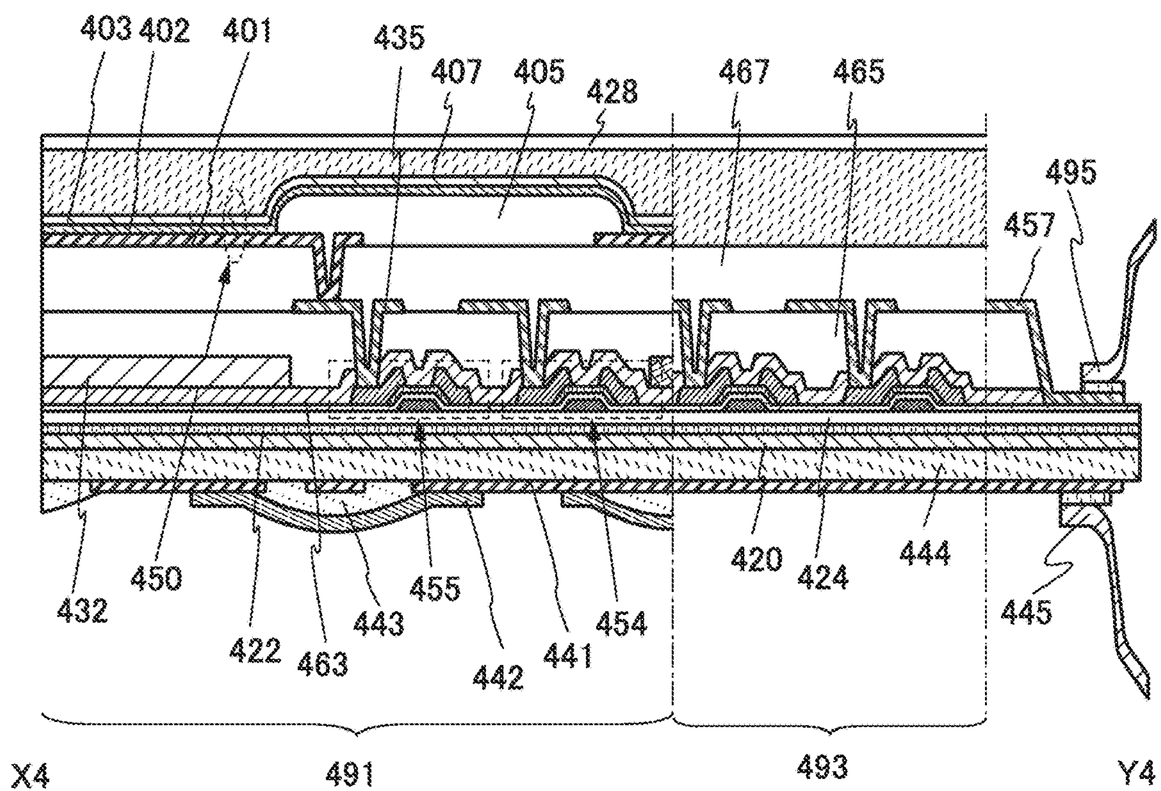

Note that a touch sensor may be provided so as to overlap with the flexible substrate 420 as illustrated in FIG. 12A. The touch sensor includes a conductive layer 441, a conductive layer 442, and an insulating layer 443. As illustrated in FIG. 12B, a flexible substrate 444 may be provided between the flexible substrate 420 and the touch sensor. Note that the touch sensor may be provided between the flexible substrate 420 and the flexible substrate 444. An FPC 445 for the touch sensor may further be provided.

The light-emitting device described in Structural Example 2 can be fabricated with high yield using the separating method described above. According to the separating method, the insulating layer 424 and the transistors are formed over the formation substrate, as the layer to be separated, whereby the insulating layer 424 and the transistors can be formed at high temperature. The use of the insulating layer 424 and the transistors formed at high temperature enables the light-emitting device to have high reliability. Note that the organic EL element 450 or the like may also be formed as the layer to be separated.

Structural Example 3

FIG. 13A1 is a plan view of a light-emitting device, and FIG. 13B is a cross-sectional view along dashed-dotted line X5-Y5 in FIG. 13A1. The light-emitting device illustrated in FIG. 13A1 is a top-emission light-emitting device using a color filter method.

The light-emitting device illustrated in FIG. 13B includes the flexible substrate 420, the bonding layer 422, the insulating layer 424, the transistor 455, the insulating layer 463, the insulating layer 465, the insulating layer 405, a spacer 496, the organic EL element 450 (the first electrode 401, the EL layer 402, and the second electrode 403), the bonding layer 407, an overcoat 453, a light-blocking layer 431, the coloring layer 432, an insulating layer 226, a bonding layer 426, the flexible substrate 428, and the conductive layer 457. The flexible substrate 428, the bonding layer 426, the insulating layer 226, the bonding layer 407, the overcoat 453, and the second electrode 403 transmit visible light.

In the light-emitting portion 491 of the light-emitting device in FIG. 13B, the transistor 455 and the organic EL element 450 are provided over the flexible substrate 420 with the bonding layer 422 and the insulating layer 424 provided therebetween. The organic EL element 450 includes the first electrode 401 over the insulating layer 465, the EL layer 402 over the first electrode 401, and the second electrode 403 over the EL layer 402. The first electrode 401 is electrically connected to a source electrode or a drain electrode of the transistor 455. The end portion of the first electrode 401 is covered with the insulating layer 405. The first electrode 401 preferably reflects visible light. The spacer 496 is provided over the insulating layer 405. The spacer 496 allows adjustment of the distance between the flexible substrate 420 and the flexible substrate 428.

Moreover, the light-emitting device includes the coloring layer 432 overlapping with the organic EL element 450 with the bonding layer 407 provided therebetween, and the light-blocking layer 431 overlapping with the insulating layer 405 with the bonding layer 407 provided therebetween.

The driver circuit portion 493 includes a plurality of transistors. FIG. 13B illustrates one of the transistors in the driver circuit portion 493.

The conductive layer 457 is electrically connected to an external input terminal through which a signal or a potential from the outside is transmitted to the driver circuit portion 493. Here, the example in which the FPC 495 is provided as the external input terminal is described. Moreover, here, the example in which the conductive layer 457 is formed using the same material and the same step(s) as those of the electrodes of the transistor 455 is described.

In the light-emitting device illustrated in FIG. 13B, the connector 497 is located over the flexible substrate 428. The connector 497 is connected to the conductive layer 457 through an opening formed in the flexible substrate 428, the bonding layer 426, the insulating layer 226, the bonding layer 407, the insulating layer 465, and the insulating layer 463. Moreover, the connector 497 is connected to the FPC 495. The FPC 495 and the conductive layer 457 are electrically connected to each other through the connector 497. In the case where the conductive layer 457 and the flexible substrate 428 overlap with each other, the conductive layer 457, the connector 497, and the FPC 495 are electrically connected to one another by forming an opening in the flexible substrate 428 (or using a flexible substrate having an opening).

The insulating layer 424 preferably has an excellent gas barrier property, in which case moisture and oxygen from the flexible substrate 420 side can be prevented from entering the light-emitting device. Similarly, the insulating layer 226 preferably has an excellent gas barrier property, in which case moisture and oxygen from the flexible substrate 428 side can be prevented from entering the light-emitting device.

The light-emitting device described in Structural Example 3 can be fabricated with high yield using the separating method described above. According to the separating method, the insulating layer 424, the transistors, the organic EL element 450, and the like are formed over the formation substrate, as a layer to be separated. Then, the insulating layer 226, the coloring layer 432, the light-blocking layer 431, and the like are formed over another formation substrate, as a layer to be separated. After the two formation substrates are bonded to each other, the layers to be separated and the formation substrates are separated from each other. Then, the layers to be separated and the flexible substrates are bonded to each other with a bonding layer, so that the light-emitting device described in Structural Example 3 can be fabricated.

According to the separating method of one embodiment of the present invention, an insulating layer and transistors can be formed over a formation substrate at high temperature. The use of the insulating layer 424, the insulating layer 226, and the transistors formed at high temperature enables the light-emitting device to have high reliability. The insulating layers with an excellent gas barrier property (insulating layers 226 and 424) formed at high temperature can be provided over and below the organic EL element 450. This can prevent impurities such as moisture from entering the organic EL element 450.

Structural Example 4

FIG. 13A2 is a plan view of a light-emitting device, and FIG. 13C is a cross-sectional view along dashed-dotted line X6-Y6 in FIG. 13A2. The light-emitting device illustrated in FIG. 13A2 is a top-emission light-emitting device using a color filter method.

The light-emitting device illustrated in FIG. 13C includes the flexible substrate 420, the bonding layer 422, the insulating layer 424, the transistor 455, the insulating layer 463, the insulating layer 465, the insulating layer 405, the organic EL element 450 (the first electrode 401, the EL layer 402, and the second electrode 403), a frame-like bonding layer 404*a*, a frame-like bonding layer 404*b*, the bonding layer 407, the overcoat 453, the light-blocking layer 431, the coloring layer 432, the insulating layer 226, the bonding layer 426, the flexible substrate 428, and the conductive layer 457. The flexible substrate 428, the bonding layer 426, the insulating layer 226, the bonding layer 407, the overcoat 453, and the second electrode 403 transmit visible light.

In the light-emitting portion 491 of the light-emitting device in FIG. 13C, the transistor 455 and the organic EL element 450 are provided over the flexible substrate 420 with the bonding layer 422 and the insulating layer 424 provided therebetween. The organic EL element 450 includes the first electrode 401 over the insulating layer 465, the EL layer 402 over the first electrode 401, and the second electrode 403 over the EL layer 402. The first electrode 401 is electrically connected to a source electrode or a drain electrode of the transistor 455. The end portion of the first electrode 401 is covered with the insulating layer 405. The first electrode 401 preferably reflects visible light. Moreover, the light-emitting device includes the coloring layer 432 overlapping with the organic EL element 450 with the bonding layer 407 provided therebetween, and the light-blocking layer 431 overlapping with the insulating layer 405 with the first bonding layer 407 provided therebetween.

The driver circuit portion 493 includes a plurality of transistors. FIG. 13C illustrates one of the transistors in the driver circuit portion 493. An example where the driver circuit portion 493 is positioned in a region surrounded by the frame-like bonding layers 404*a* and 404*b* is described in this embodiment; however, the driver circuit portion 493 may be positioned outside one or both of the frame-like bonding layers 404*a* and 404*b*.

The conductive layer 457 is electrically connected to an external input terminal through which a signal or a potential from the outside is transmitted to the driver circuit portion 493. Here, the example in which the FPC 495 is provided as the external input terminal is described. Moreover, here, an example in which the conductive layer 457 is formed using the same material and the same step(s) as those of the electrodes of the transistor 455 is described. The connector 497 over the insulating layer 226 is connected to the conductive layer 457. Moreover, the connector 497 is connected to the FPC 495. The FPC 495 and the conductive layer 457 are electrically connected to each other through the connector 497.

The conductive layer 457 is preferably positioned outside the frame-like bonding layer 404*a* because the entry of impurities such as moisture into the organic EL element 450 can be prevented even in the case where moisture and the like easily enter from a connection portion between the FPC 495 and the connector 497 and a connection portion between the connector 497 and the conductive layer 457.

The light-emitting device illustrated in FIG. 13C is different from that in FIG. 13B in that the insulating layer 465 is covered at a side surface of the light-emitting device. In the case of using an organic insulating material or the like having an inferior gas barrier property as a material of the insulating layer 465, the insulating layer 465 is preferably covered at the side surface of the light-emitting device. In addition, the frame-like bonding layer having an excellent gas barrier property is preferably positioned at the side surface of the light-emitting device to increase the reliability of the light-emitting device. Note that the insulating layer 465 is not necessarily covered at an end portion of the light-emitting device depending on a material or the like for the insulating layer 465, as illustrated in FIG. 13B.

The frame-like bonding layer 404*a* and the frame-like bonding layer 404*b* preferably have a more excellent gas barrier property than the bonding layer 407, in which case moisture and oxygen can be prevented from entering the light-emitting device through the side surface of the light-emitting device. Thus, the light-emitting device can be highly reliable.

For example, the frame-like bonding layer 404*a* has the lowest water vapor permeability among the bonding layer 407, the frame-like bonding layer 404*a*, and the frame-like bonding layer 404*b*. Particularly when the frame-like bonding layer 404*b* includes a desiccating agent or the like that adsorbs moisture, entry of moisture is suppressed by the frame-like bonding layer 404*a* and moisture that passes through the frame-like bonding layer 404*a* is adsorbed by the frame-like bonding layer 404*b*, whereby entry of moisture into the bonding layer 407, and furthermore, the organic EL element 450 can be suppressed.

In Structural Example 4, light emission of the organic EL element 450 is extracted from the light-emitting device through the bonding layer 407. For this reason, the bonding layer 407 preferably has a more excellent light-transmitting property than the frame-like bonding layers 404*a* and 404*b*. Furthermore, the bonding layer 407 preferably has a higher refractive index than the frame-like bonding layers 404*a* and 404*b*. In addition, it is preferred that the volume of the bonding layer 407 be less reduced by curing than those of the frame-like bonding layers 404*a* and 404*b*.

The light-emitting device described in Structural Example 4 can be fabricated with high yield using the separating method described above. According to the separating method, the insulating layer 424, the transistors, the organic EL element 450, and the like are formed over the formation substrate, as a layer to be separated. Then, the insulating layer 226, the coloring layer 432, the light-blocking layer 431, and the like are formed over another formation substrate, as a layer to be separated. After the two formation substrates are bonded to each other, the layers to be separated and the formation substrates are separated from each other. Then, the layers to be separated and the flexible substrates are bonded to each other with a bonding layer, so that the light-emitting device described in Structural Example 4 can be fabricated.

According to the separating method described above, an insulating layer and transistors can be formed over a formation substrate at high temperature. The use of the insulating layer 424, the insulating layer 226, and the transistors formed at high temperature enables the light-emitting device to have high reliability. The insulating layers with an excellent gas barrier property (insulating layers 226 and 424) formed at high temperature can be provided over and below the organic EL element 450. This can prevent impurities such as moisture from entering the organic EL element 450.

As described above, in Structural Example 4, the insulating layer 424, the insulating layer 226, and the frame-like bonding layers 404*a* and 404*b* can suppress entry of impurities such as moisture from the front surface (display surface), the back surface (the surface opposite to the display surface), and side surfaces of the light-emitting device into the organic EL element 450. This increases the reliability of the light-emitting device.

Note that although an organic EL element is used as the display element here, one embodiment of the present invention is not limited thereto.

For example, in this specification and the like, a display element, a display device, which is a device including a display element, a light-emitting element, and a light-emitting device, which is a device including a light-emitting element, can employ a variety of modes or can include a variety of elements. Examples of a display element, a display device, a light-emitting element, or a light-emitting device include a display medium whose contrast, luminance, reflectance, transmittance, or the like is changed by an electromagnetic action, such as an electroluminescence (EL) element (e.g., an EL element including organic and inorganic materials, an organic EL element, and an inorganic EL element), an LED (e.g., a white LED, a red LED, a green LED, and a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical system (MEMS), a digital micromirror device (DMD), a digital micro shutter (DMS), MIRASOL (registered trademark), an interferometric modulation (IMOD) element, a MEMS shutter display element, an optical-interference-type MEMS display element, an electrowetting element, a piezoelectric ceramic display, and a carbon nanotube. Note that examples of display devices using EL elements include an EL display. Examples of display devices including electron emitters include a field emission display (FED) and an SED-type flat panel display (SED: surface-conduction electron-emitter display). Examples of display devices using liquid crystal elements include a liquid crystal display (e.g., a transmissive liquid crystal display, a transflective liquid crystal display, a reflective liquid crystal display, a direct-view liquid crystal display, and a projection liquid crystal display). An example of a display device including electronic ink or electrophoretic elements is electronic paper.

Note that in one embodiment of the present invention, an active matrix method in which an active element (non-linear element) is included in a pixel or a passive matrix method in which an active element is not included in a pixel can be used.

In an active matrix method, as an active element, not only a transistor but also various active elements can be used. For example, an MIM (metal insulator metal), a TFD (thin film diode), or the like can be used. Since such an element has few numbers of manufacturing steps, the manufacturing cost can be reduced or the yield can be improved. Furthermore, since the size of these elements is small, the aperture ratio can be improved, so that power consumption can be reduced or higher luminance can be achieved.

Since an active element is not used in a passive matrix method, the number of manufacturing steps is small, so that the manufacturing cost can be reduced or the yield can be improved. Furthermore, since an active element is not used, the aperture ratio can be improved, so that power consumption can be reduced or higher luminance can be achieved, for example.

Examples of semiconductor layers that can be used for a transistor include a polysilicon film and an oxide semiconductor film.

Oxide semiconductors are classified into a single crystal oxide semiconductor and a non-single-crystal oxide semiconductor. Examples of a non-single-crystal oxide semiconductor include a c-axis aligned crystalline oxide semiconductor (CAAC-OS), a polycrystalline oxide semiconductor, a microcrystalline oxide semiconductor, and an amorphous oxide semiconductor.

From another perspective, oxide semiconductors are classified into an amorphous oxide semiconductor and a crystalline oxide semiconductor. Examples of a crystalline oxide semiconductor include a single crystal oxide semiconductor, a CAAC-OS, a polycrystalline oxide semiconductor, and a microcrystalline oxide semiconductor.

First, a CAAC-OS film will be described. Note that a CAAC-OS can be referred to as an oxide semiconductor including c-axis aligned nanocrystals (CANC).

A CAAC-OS film is one of oxide semiconductor films having a plurality of c-axis aligned crystal parts (also referred to as pellets).

In a combined analysis image (also referred to as a high-resolution TEM image) of a bright-field image and a diffraction pattern of a CAAC-OS, which is obtained using a transmission electron microscope (TEM), a plurality of pellets can be observed. However, in the high-resolution TEM image, a boundary between pellets, that is, a grain boundary is not clearly observed. Thus, in the CAAC-OS, a reduction in electron mobility due to the grain boundary is less likely to occur.

The CAAC-OS has a characteristic atomic arrangement. The size of a pellet is approximately 1 nm to 3 nm, and the size of a space caused by tilt of the pellets is approximately 0.8 nm. Therefore, the pellet can also be referred to as a nanocrystal (nc).

A Cs-corrected high-resolution TEM image of a plane of the CAAC-OS observed from a direction substantially perpendicular to the sample surface shows that metal atoms are arranged in a triangular, quadrangular, or hexagonal configuration in a pellet. However, there is no regularity of arrangement of metal atoms between different pellets.

Next, a CAAC-OS analyzed by electron diffraction will be described. For example, when an electron beam with a probe diameter of 300 nm is incident on a CAAC-OS including an $InGaZnO_4$ crystal in the direction parallel to the sample surface, a diffraction pattern (also referred to as a selected-area transmission electron diffraction pattern) might be obtained. In this diffraction pattern, spots derived from the (009) plane of an $InGaZnO_4$ crystal are included. Thus, the electron diffraction also indicates that pellets included in the CAAC-OS have c-axis alignment and that the c-axes are aligned in the direction substantially perpendicular to the formation surface or the top surface of the CAAC-OS. Meanwhile, a ring-like diffraction pattern is observed when an electron beam with a probe diameter of 300 nm is incident on the same sample in a direction perpendicular to the sample surface. Thus, the electron diffraction also indicates that the a-axes and b-axes of the pellets included in the CAAC-OS do not have regular alignment.

Moreover, the CAAC-OS is an oxide semiconductor having a low density of defect states. Defects in the oxide semiconductor are, for example, a defect due to an impurity and oxygen vacancies. Therefore, the CAAC-OS can be regarded as an oxide semiconductor with a low impurity concentration, or an oxide semiconductor having a small number of oxygen vacancies.

The impurity contained in the oxide semiconductor might serve as a carrier trap or serve as a carrier generation source. Furthermore, oxygen vacancies in the oxide semiconductor might serve as carrier traps or serve as carrier generation sources when hydrogen is captured therein.

Note that the impurity means an element other than the main components of the oxide semiconductor, such as hydrogen, carbon, silicon, or a transition metal element. For example, an element (specifically, silicon or the like) having higher strength of bonding to oxygen than a metal element included in an oxide semiconductor extracts oxygen from the oxide semiconductor, which results in disorder of the atomic arrangement and reduced crystallinity of the oxide semiconductor. A heavy metal such as iron or nickel, argon, carbon dioxide, or the like has a large atomic radius (or molecular radius), and thus disturbs the atomic arrangement of the oxide semiconductor and decreases crystallinity.

An oxide semiconductor having a low density of defect states (a small number of oxygen vacancies) can have a low carrier density. Such an oxide semiconductor is referred to as a highly purified intrinsic or substantially highly purified intrinsic oxide semiconductor. A CAAC-OS has a low impurity concentration and a low density of defect states. That is, a CAAC-OS is likely to be highly purified intrinsic or substantially highly purified intrinsic oxide semiconductor. Thus, a transistor including a CAAC-OS rarely has negative threshold voltage (is rarely normally on). The highly purified intrinsic or substantially highly purified intrinsic oxide semiconductor has few carrier traps. Electric charge trapped by the carrier traps in the oxide semiconductor takes a long time to be released. The trapped electric charge may behave like a fixed electric charge. Thus, the transistor which includes the oxide semiconductor having a high impurity concentration and a high density of defect states might have unstable electrical characteristics. However, a transistor including a CAAC-OS has small variations in electrical characteristics and high reliability.

Since the CAAC-OS has a low density of defect states, carriers generated by light irradiation or the like are less likely to be trapped in defect states. Therefore, in a transistor using the CAAC-OS, a change in electrical characteristics due to irradiation with visible light or ultraviolet light is small.

A transistor using the CAAC-OS film has excellent flexibility. A display panel including the transistor using the CAAC-OS film as a switching element of a pixel can resist 100000-time bending performed with a radius of curvature of 5 mm in a bending test.

Although a tungsten film is used as the separation layer in this embodiment, one embodiment of the present invention is not particularly limited thereto and an organic resin such as a polyimide resin may be used for the separation layer. Alternatively, an organic resin may be used for the separation layer and may also be used as a film.

This embodiment can be freely combined with any of the other embodiments. The flexible display panel that can be fabricated in this embodiment can be used in the novel devices 101, 102, and 103 described in Embodiment 1. Furthermore, the flexible display panel of this embodiment can be used as at least one of the three display panels of the novel device 501 described in Embodiment 2.

Embodiment 4

In this embodiment, an example of fabricating a flexible secondary battery using a bag-like insulating material (hereinafter also referred to as an "envelope") for one or both of a positive electrode and a negative electrode will be described.

Figure 14:
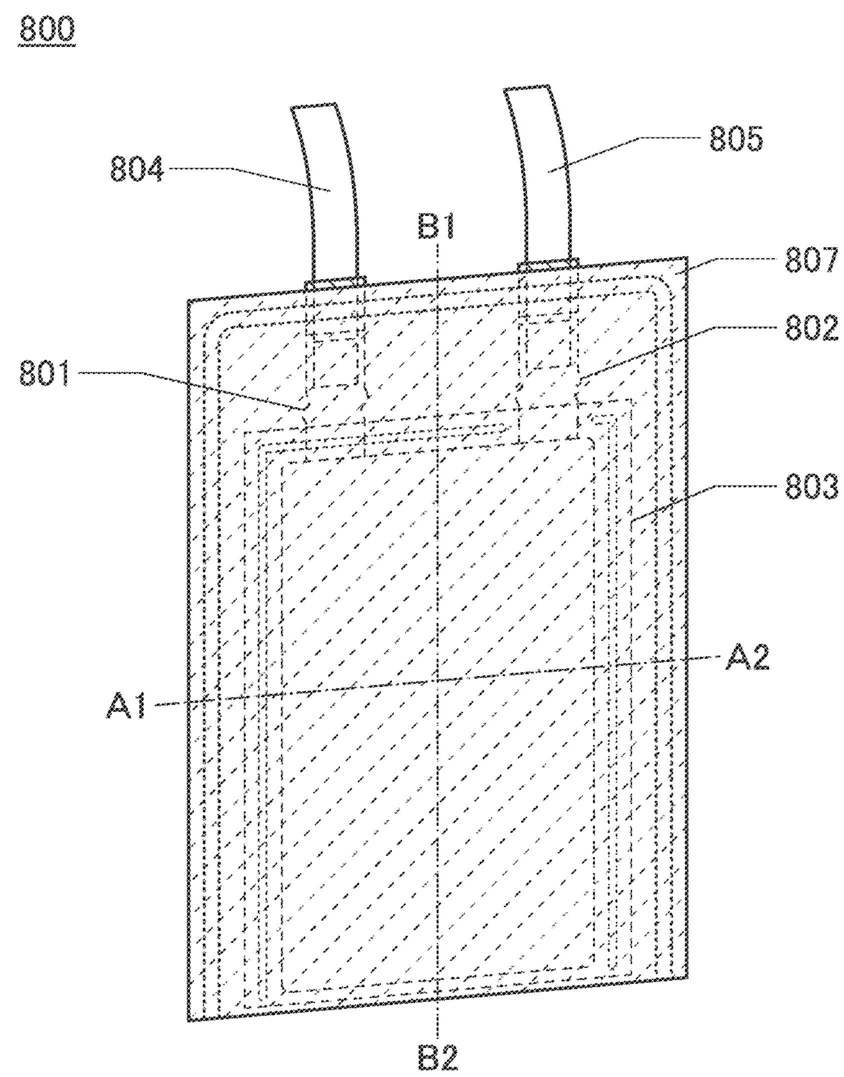
FIG. 14 illustrates an example of a power storage unit.
Figure 15A:
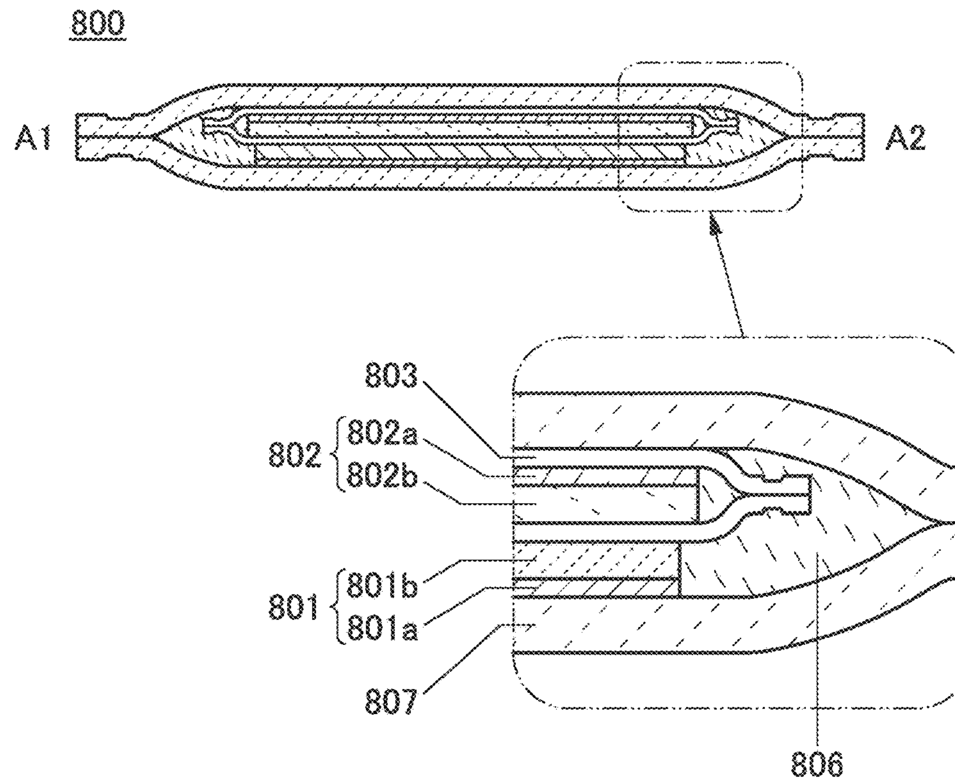
FIGS. 15A and 15B each illustrate a cross-sectional structure of a power storage unit.
Figure 15B:
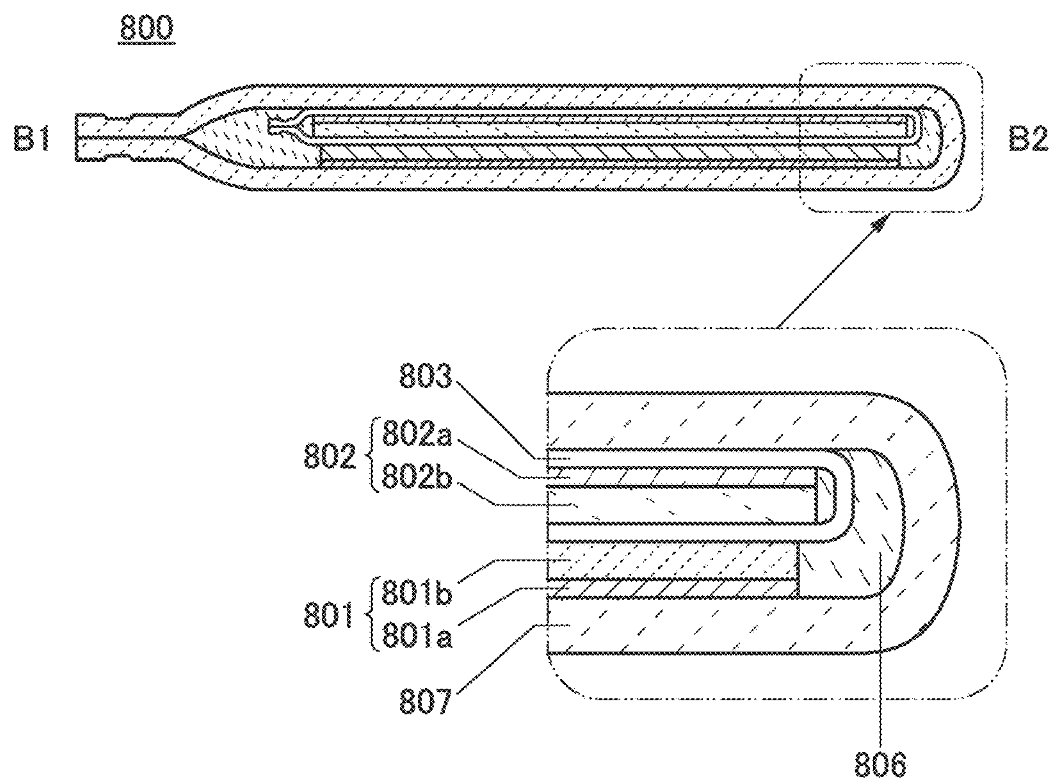

A structural example of a power storage unit 800 will be described with reference to drawings. FIG. 14 is a perspective view illustrating the appearance of the power storage unit 800. FIG. 15A is a cross-sectional view along dashed-dotted line A1-A2 in FIG. 14. FIG. 15B is a cross-sectional view of a portion along dashed-dotted line B1-B2 in FIG. 14.

The power storage unit 800 of one embodiment of the present invention includes a positive electrode 801, a negative electrode 802 covered with an envelope 803, and an electrolytic solution 806 in an exterior body 807. Although the example in which one pair of the positive electrode 801 and the negative electrode 802 is provided in the exterior body is described in this embodiment for simplicity, a plurality of pairs of the positive electrode 801 and the negative electrode 802 may be provided in the exterior body to increase the capacity of the power storage unit. The positive electrode 801 is electrically connected to a positive electrode lead 804, and the negative electrode 802 is electrically connected to a negative electrode lead 805. The positive electrode lead 804 and the negative electrode lead 805 are also referred to as lead electrodes or lead terminals. Part of the positive electrode lead 804 and part of the negative electrode lead 805 are exposed to the outside of the exterior body. The power storage unit 800 is charged and discharged via the positive electrode lead 804 and the negative electrode lead 805.

Although the negative electrode 802 is covered with the envelope 803 in FIGS. 15A and 15B, one embodiment of the present invention is not limited thereto. For example, the negative electrode 802 is not necessarily covered with the envelope 803. For example, the positive electrode 801 may be covered with the envelope 803 instead of the negative electrode 802. Alternatively, for example, not only the negative electrode 802 but also the positive electrode 801 may be covered with the envelope 803.

1. Positive Electrode

The positive electrode 801 includes, for example, a positive electrode current collector 801*a* and a positive electrode active material layer 801*b* formed over the positive electrode current collector 801*a*. Although the example of providing the positive electrode active material layer 801*b* over one surface of the positive electrode current collector 801*a* with a sheet form (or a strip-like form) is described, one embodiment of the present invention is not limited to this example. The positive electrode active material layers 801*b* may be provided so that the positive electrode current collector 801*a* is sandwiched therebetween, in which case the capacity of the power storage unit 800 can be increased. Although the positive electrode active material layer 801*b* is provided over the entire region of the positive electrode current collector 801*a* in this embodiment, the positive electrode active material layer 801*b* may be provided over part of the positive electrode current collector 801*a*. For example, it is preferred that the positive electrode active material layer 801*b* not be provided over a portion (hereinafter also referred to as a "positive electrode tab") of the positive electrode current collector 801*a* that is electrically connected to the positive electrode lead 804.

The positive electrode current collector 801*a* can be formed using a material which has high conductivity and is not alloyed with a carrier ion of lithium or the like, such as stainless steel, gold, platinum, zinc, iron, copper, aluminum, and titanium, an alloy thereof, and the like. Alternatively, an aluminum alloy to which an element that improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 801*a* can have a foil-like shape, a plate-like shape (sheet-like shape), a net-like shape, a punching-metal shape, an expanded-metal shape, or the like as appropriate. The positive electrode current collector 801*a* preferably has a thickness greater than or equal to 5 μm and less than or equal to 30 μm. The surface of the positive electrode current collector 801*a* may be provided with an undercoat using graphite or the like.

The positive electrode active material layer 801*b* may further include a binder for increasing adhesion of positive electrode active materials, a conductive additive for increasing the conductivity of the positive electrode active material layer 801*b*, and the like in addition to the positive electrode active materials.

Examples of a positive electrode active material used for the positive electrode active material layer 801*b* include a composite oxide with an olivine crystal structure, a composite oxide with a layered rock-salt crystal structure, and a composite oxide with a spinel crystal structure. As the positive electrode active material, a compound such as $LiFeO_2$, $LiCoO_2$, $LiNiO_2$, $LiMn_2O_4$, $V_2O_5$, $Cr_2O_5$, and $MnO_2$ can be used.

$LiCoO_2$ is particularly preferable because it has high capacity, stability in the air higher than that of $LiNiO_2$, and thermal stability higher than that of $LiNiO_2$, for example.

A small amount of lithium nickel oxide ($LiNiO_2$ or $LiNi_{1-x}MO_2$ (M=Co, Al, or the like)) is preferably added to a lithium-containing material with a spinel crystal structure which contains manganese, such as $LiMn_2O_4$, because advantages such as inhibition of the elution of manganese and the decomposition of an electrolytic solution can be obtained.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\leq 1$, $0<a\leq 1$, and $0<b<1$), $LiFe_cNi_dCo_ePO_4$, $LiFe_cNi_dMn_ePO_4$, $LiNi_cCo_dMn_ePO_4$ ($c+d+e\leq 1$, $0<c<1$, $0<d<1$, and $0<e<1$), and $LiFe_fNi_gCo_hMn_iPO_4$ ($f+g+h+i\leq 1$, $0<f<1$, $0<g<1$, $0<h<1$, and $0<i<1$).

$LiFePO_4$ is particularly preferable because it properly has properties necessary for the positive electrode active material, such as safety, stability, high capacity density, high potential, and the existence of lithium ions which can be extracted in initial oxidation (charge).

Alternatively, a complex material such as $Li_{(2-j)}MSiO_4$ (general formula) (M is one or more of Fe(II), Mn(II), Co(II), and Ni(II); $0\leq j\leq 2$) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l\leq 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q\leq 1$, $0<m<1$, $0<n<1$, and $0<q<1$), and $Li_{(2-j)}Fe_rNi_sCo_tMn_uSiO_4$ ($r+s+t+\leq 1$, $0<r<1$, $0<s<1$, $0<t<1$, and $0<u<1$).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material. For example, the positive electrode active material may be a layered oxide containing sodium, such as $NaFeO_2$ and $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

Note that although not illustrated, a conductive material such as a carbon layer may be provided on the surface of the positive electrode active material layer 801*b*. Providing a conductive material such as a carbon layer lead to increase in the conductivity of an electrode. For example, the positive electrode active material layer 801*b* can be coated with a carbon layer by mixing a carbohydrate such as glucose at the time of baking the positive electrode active material.

The average diameter of primary particles of the positive electrode active material layer 801*b* is preferably greater than or equal to 50 nm and less than or equal to 100 μm.

Examples of the conductive additive include acetylene black (AB), graphite (black lead) particles, carbon nanotubes, graphene, and fullerene.

A network for electrical conduction can be formed in the positive electrode 801 by the conductive additive. The conductive additive also allows maintaining of a path for electric conduction between the positive electrode active materials in the positive electrode active material layer 801*b*. The addition of the conductive additive to the positive electrode active material layer 801*b* increases the electrical conductivity of the positive electrode active material layer 801*b*.

As the binder, polyvinylidene fluoride (PVDF) as a typical example, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can be used.

The binder content in the positive electrode active material layer 801*b* is preferably greater than or equal to 1 wt % and less than or equal to 10 wt %, more preferably greater than or equal to 2 wt % and less than or equal to 8 wt %, still more preferably greater than or equal to 3 wt % and less than or equal to 5 wt %. The conductive additive content in the positive electrode active material layer 801*b* is preferably greater than or equal to 1 wt % and less than or equal to 10 wt %, more preferably greater than or equal to 1 wt % and less than or equal to 5 wt %.

In the case where the positive electrode active material layer 801*b* is formed by a coating method, the positive electrode active material, the binder, and the conductive additive are mixed to form a positive electrode paste (slurry), and the positive electrode paste is applied to the positive electrode current collector 801*a* and dried.

2. Negative Electrode

The negative electrode 802 includes, for example, a negative electrode current collector 802*a* and a negative electrode active material layer 802*b* formed over the negative electrode current collector 802*a*. Although the example of providing the negative electrode active material layer 802*b* over one surface of the negative electrode current collector 802*a* with a sheet form (or a strip-like form) is described, one embodiment of the present invention is not limited to this example. The negative electrode active material layers 802*b* may be provided so that the negative electrode current collector 802*a* is sandwiched therebetween, in which case the capacity of the power storage unit 800 can be increased. Although the negative electrode active material layer 802*b* is provided over the entire region of the negative electrode current collector 802*a* in this embodiment, the negative electrode active material layer 802*b* may be provided over part of the negative electrode current collector 802*a*. For example, it is preferred that the negative electrode active material layer 802*b* not be provided over a portion (hereinafter also referred to as a "negative electrode tab") of the negative electrode current collector 802*a* that is electrically connected to the negative electrode lead 805.

The negative electrode current collector 802*a* can be formed using a material which has high conductivity and is not alloyed with a carrier ion of lithium or the like, such as stainless steel, gold, platinum, zinc, iron, copper, and titanium, an alloy thereof, and the like. Alternatively, an aluminum alloy to which an element that improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 802*a* can have a foil-like shape, a plate-like shape (sheet-like shape), a net-like shape, a punching-metal shape, an expanded-metal shape, or the like as appropriate. The negative electrode current collector 802*a* preferably has a thickness greater than or equal to 5 μm and less than or equal to 30 μm. The surface of the negative electrode current collector 802*a* may be provided with an undercoat using graphite or the like.

The negative electrode active material layer 802*b* may further include a binder for increasing adhesion of negative electrode active materials, a conductive additive for increasing the conductivity of the negative electrode active material layer 802*b*, and the like in addition to the negative electrode active materials.

There is no particular limitation on the material of the negative electrode active material layer 802*b* as long as it is a material with which lithium can be dissolved and precipitated or a material into/from which lithium ions can be intercalated and deintercalated. Other than a lithium metal or lithium titanate, a carbon-based material generally used in the field of power storage, or an alloy-based material can be used as the negative electrode active material layer 802*b*.

The lithium metal is preferable because of its low redox potential (3.045 V lower than that of a standard hydrogen electrode) and high specific capacity per unit weight and per unit volume (3860 mAh/g and 2062 mAh/$cm^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. $Li/Li^+$) when lithium ions are intercalated into a gap between layers of the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, an alloy-based material or an oxide which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Zn, Cd, In, Ga, and the like can be used as such an alloy-based material, for example. Such elements have higher capacity than carbon. In particular, silicon has a significantly high theoretical capacity of 4200 mAh/g. For this reason, silicon is preferably used as the negative electrode active material. Examples of the material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material layer 802*b*, an oxide such as SiO, SnO, $SnO_2$, titanium oxide ($TiO_2$), lithium titanium oxide ($Li_4T_{15}O_{12}$), lithium-graphite intercalation compound ($Li_xC_6$), niobium oxide ($Nb_2O_5$, tungsten oxide ($WO_2$), or molybdenum oxide ($MoO_2$) can be used.

Still alternatively, for the negative electrode active material layer 802*b*, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/$cm^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material layer 802*b*; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

In the case where the negative electrode active material layer 802*b* is formed by a coating method, the negative electrode active material and the binder are mixed to form a negative electrode paste (slurry), and the negative electrode paste is applied to the negative electrode current collector 802*a* and dried. Note that a conductive additive may be added to the negative electrode paste.

Graphene may be formed on a surface of the negative electrode active material layer 802*b*. For example, in the case of using silicon for the negative electrode active material layer 802*b*, the volume of silicon is greatly changed by reception and release of carrier ions in charge and discharge cycles. Thus, adhesion between the negative electrode current collector 802*a* and the negative electrode active material layer 802*b* is decreased, resulting in degradation of battery characteristics caused by charge and discharge. In view of this, graphene is preferably formed on the surface of the negative electrode active material layer 802*b* containing silicon, in which case even when the volume of silicon is changed in charge and discharge cycles, decrease in adhesion between the negative electrode current collector 802*a* and the negative electrode active material layer 802*b* can be inhibited, which makes it possible to reduce degradation of battery characteristics.

Alternatively, a coating film of an oxide or the like may be formed on the surface of the negative electrode active material layer 802*b*. A coating film formed by decomposition or the like of an electrolytic solution in charging cannot release electric charge used at the formation, and therefore forms irreversible capacity. In contrast, the film of an oxide or the like provided on the surface of the negative electrode active material layer 802*b* in advance can reduce or prevent generation of irreversible capacity.

As the coating film coating the negative electrode active material layer 802*b*, an oxide film of any one of niobium, titanium, vanadium, tantalum, tungsten, zirconium, molybdenum, hafnium, chromium, aluminum, and silicon or an oxide film containing any one of these elements and lithium can be used. Such a film is denser than a conventional film formed on a surface of a negative electrode because of a decomposition product of an electrolyte solution.

For example, niobium oxide ($Nb_2O_5$) has a low electric conductivity of $10^{-9}$ S/cm and an excellent insulating property. For this reason, a niobium oxide film hinders an electrochemical decomposition reaction between the negative electrode active material and the electrolytic solution. On the other hand, niobium oxide has a lithium diffusion coefficient of $10^{-9}$ $cm^2$/sec and high lithium ion conductivity. Therefore, niobium oxide can transmit lithium ions.

A sol-gel method can be used to coat the negative electrode active material layer 802*b* with the coating film, for example. The sol-gel method is a method for forming a thin film in such a manner that a solution of metal alkoxide, a metal salt, or the like is changed into a gel, which has lost its fluidity, by a hydrolysis reaction and a polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 802*b*. Decrease in the capacity of the power storage unit can be prevented by using the coating film.

3. Envelope

Examples of materials for forming the envelope 803 include porous insulators such as cellulose, polypropylene (PP), polyethylene (PE), polybutene, nylon, polyester, polysulfone, polyacrylonitrile, polyvinylidene fluoride, and tetrafluoroethylene. Alternatively, nonwoven fabric of a glass fiber or the like, or a diaphragm in which a glass fiber and a polymer fiber are mixed can be used.

Repeated charge of a power storage unit using lithium might cause lithium deposition on the negative electrode. In particular, lithium deposited in a needle-like form is likely to cause a negative electrode and a positive electrode to be short-circuited. The envelope 803 covering the negative electrode 802 is slid over a surface of the negative electrode active material layer 802*b* in bending the power storage unit 800, so that lithium deposited on the surface of the negative electrode active material layer 802*b* can be removed. This can prevent a short circuit between the positive electrode 801 and the negative electrode 802 and prevent functional decline of the power storage unit 800. Furthermore, the reliability of the power storage unit 800 can be increased. Particularly in the case where the negative electrode active material layers 802*b* are provided so that the negative electrode current collector 802*a* is sandwiched therebetween, lithium deposited on both the surfaces of the negative electrode active material layer 802*b* can be removed in bending the power storage unit 800. Bending the power storage unit 800 on purpose can increase the impact described above.

Although the negative electrode 802 is covered with the envelope 803 here, one embodiment of the present invention is not limited thereto. For example, the negative electrode 802 is not necessarily covered with the envelope 803. For example, the positive electrode 801 may be covered with the envelope 803 instead of the negative electrode 802. Alternatively, for example, not only the negative electrode 802 but also the positive electrode 801 may be covered with the envelope 803.

4. Electrolytic Solution

As a solvent of the electrolytic solution 806 used for the power storage unit 800 an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a high-molecular material that undergoes gelation is used as a solvent of the electrolytic solution, safety against liquid leakage and the like is improved. Furthermore, a secondary battery can be thinner and more lightweight. Typical examples of the high-molecular material that undergoes gelation include a silicone gel, an acrylic gel, an acrylonitrile gel, polyethylene oxide, polypropylene oxide, a fluorine-based polymer, and the like.

Alternatively, the use of one or more kinds of ionic liquids (room temperature molten salts) which have features of non-flammability and non-volatility as a solvent of the electrolytic solution can prevent the power storage unit from exploding or catching fire even when the power storage unit internally shorts out or the internal temperature increases owing to overcharging or the like.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for the power storage unit is preferably highly purified and contains a small amount of dust particles and elements other than the constituent elements of the electrolytic solution (hereinafter, also simply referred to as impurities). Specifically, the weight ratio of impurities to the electrolyte solution is less than or equal to 1%, preferably less than or equal to 0.1%, and more preferably less than or equal to 0.01%. An additive agent such as vinylene carbonate may be added to the electrolyte solution.

5. Exterior Body

There are a variety of structures of a secondary battery, and a film is used for formation of the exterior body 807 in this embodiment. Note that the film used as the exterior body 807 is a single-layer film selected from metal films (e.g., an aluminum film, a stainless steel film, and a nickel steel film), a plastic film made of an organic material, a hybrid material film containing an organic material (e.g., an organic resin or fiber) and an inorganic material (e.g., ceramic), and carbon-containing films (e.g., a carbon film and a graphite film), or a layered film including two or more of the above films. Metal films are easy to be embossed. Forming depressions or projections by embossing increases the surface area of the exterior body 807 exposed to outside air, achieving efficient heat dissipation.

In the case where the power storage unit 800 is changed in form by externally applying force, bending stress is externally applied to the exterior body 807 of the power storage unit 800. This might partly deform or damage the exterior body 807. Projections or depressions formed on the exterior body 807 can relieve a strain caused by stress applied to the exterior body 807. Therefore, the reliability of the power storage unit 800 can be increased. A "strain" is the scale of change in form indicating the displacement of a point of an object relative to the reference (initial) length of the object. By forming projections or depressions on the exterior body 807, the influence of a strain caused by externally applying force to the power storage unit can be reduced to be acceptable. Thus, the power storage unit can have high reliability.

This embodiment can be implemented in combination with any of the other embodiments and an example as appropriate.

Embodiment 5

In this embodiment, an example of a fabricating method of the power storage unit 800 will be described with reference to the drawings.

1. Covering Negative Electrode with Envelope

Figure 16A:
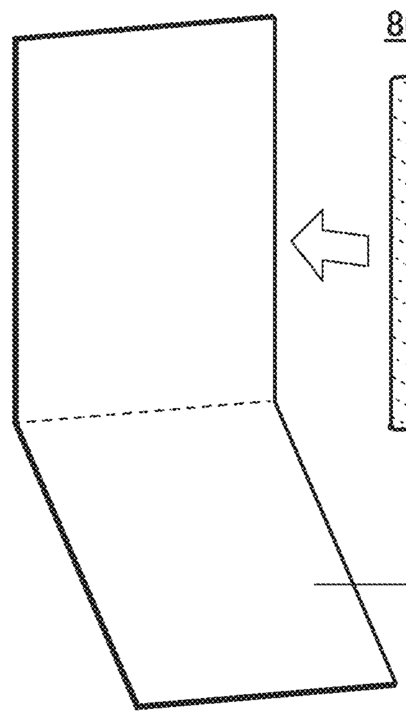
FIGS. 16A to 16D illustrate a fabricating process of a power storage unit.
Figure 16B:
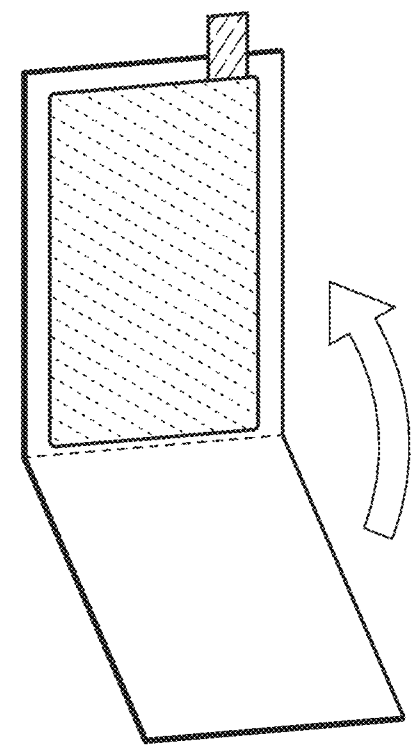
Figure 16C:
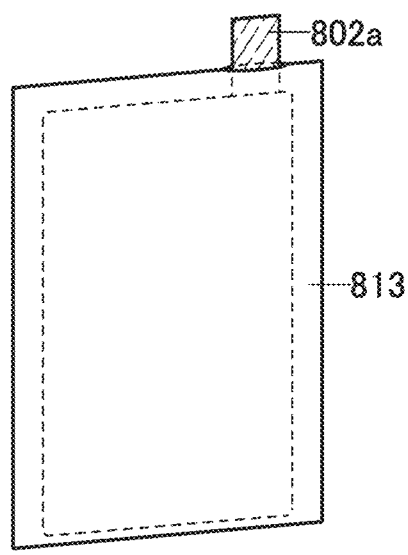

First, the negative electrode 802 is positioned over a film 813 used to form the envelope 803 (see FIG. 16A). Then, the film 813 is folded along a dotted line in FIG. 16A (see FIG. 16B) such that the negative electrode 802 is inside the folded film 813 (see FIG. 16C).

Next, the outer edges of the film 813 outside the negative electrode 802 are bonded to form the envelope 803. The bonding of the outer edges of the film 813 can be performed with the use of an adhesive or the like, by ultrasonic welding, or by thermal fusion bonding.

Figure 16D:
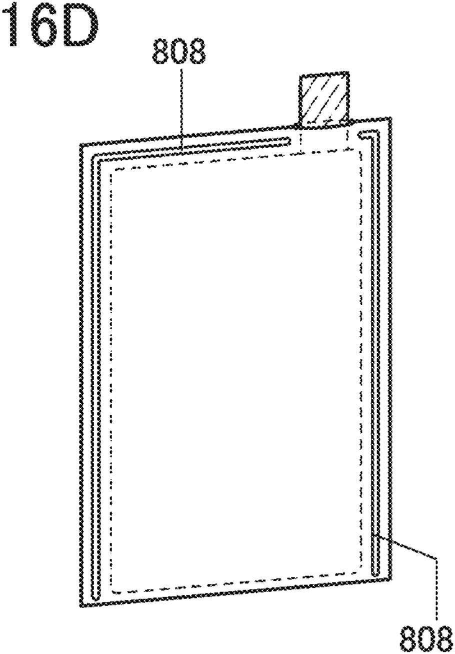

In this embodiment, polypropylene is used as the film 813 and the outer edges of the film 813 are bonded by heating. Bonding portions 808 are illustrated in FIG. 16D. In such a manner, the negative electrode 802 can be covered with the envelope 803. The envelope 803 is formed so as to cover the negative electrode active material layer **802*b* and does not have to cover the whole negative electrode 802**.

Although the film 813 is folded in FIGS. 16A to 16D, one embodiment of the present invention is not limited thereto. For example, the negative electrode 802 may be sandwiched between two films 813. In that case, the bonding portion 808 may be formed so as to surround almost all of four sides of the film.

The outer edges of the film 813 may be bonded either using bonding portions provided at irregular intervals or using dot-like bonding portions provided at regular intervals.

Alternatively, bonding may be performed on only one side of the outer edges. Alternatively, bonding may be performed on only two sides of the outer edges. Alternatively, bonding may be performed on four sides of the outer edges, in which case the four sides can be in an even state.

Although the negative electrode 802 is covered with the envelope 803 in FIGS. 16A to 16D and the like, one embodiment of the present invention is not limited thereto. For example, the negative electrode 802 is not necessarily covered with the envelope 803. For example, the positive electrode 801 may be covered with the envelope 803 instead of the negative electrode 802. Alternatively, for example, not only the negative electrode 802 but also the positive electrode 801 may be covered with the envelope 803.

For example, the structure of the bonding portion 808 of the envelope 803 covering the positive electrode 801 may be different from that of the bonding portion 808 of the envelope 803 covering the negative electrode 802.

Alternatively, two negative electrodes 802 in each of which the negative electrode current collector **802*a* has one surface provided with the negative electrode active material layer 802*b* may be prepared, stacked such that surfaces of the negative electrodes 802 each of which is not provided with the negative electrode active material layer 802*b* face each other, and covered with the envelope 803**.

The two negative electrodes 802 stacked such that the negative electrode current collectors **802*a* face each other facilitate bending of the power storage unit 800** without decreasing the strength of the electrodes.

2. Connecting Negative Electrode Lead to Negative Electrode Tab

Next, the negative electrode lead 805 including a sealing layer 815 is electrically connected to a negative electrode tab of the negative electrode current collector **802*a*** by emitting ultrasonic waves while applying pressure (ultrasonic welding).

A lead electrode is likely to be cracked or cut by stress due to external force applied after fabrication of the power storage unit.

Figure 17A:
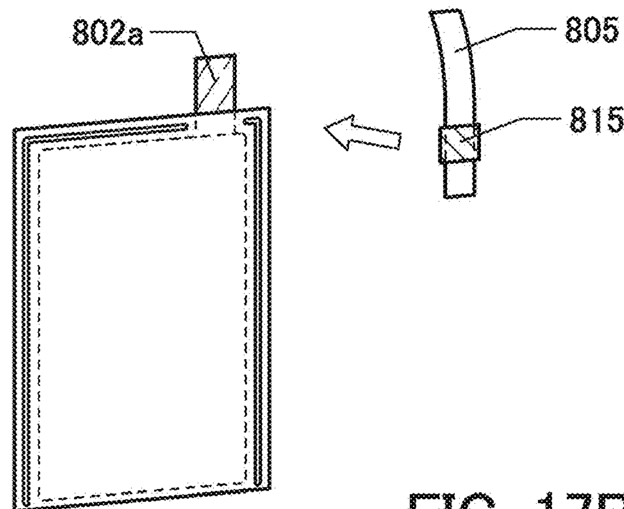
FIGS. 17A to 17D illustrate a fabricating process of a power storage unit.
Figure 17B:
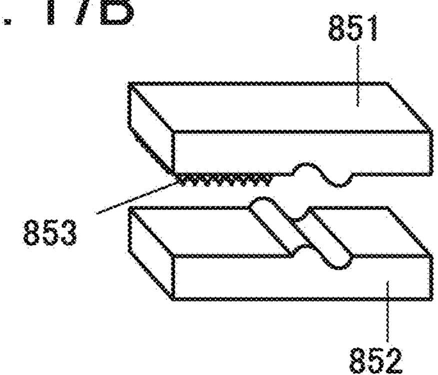

Thus, an ultrasonic welding apparatus including bonding dies illustrated in FIG. 17B is used in this embodiment. Note that only top and bottom bonding dies of the ultrasonic welding apparatus are illustrated in FIG. 17B for simplicity.

Figure 17C:
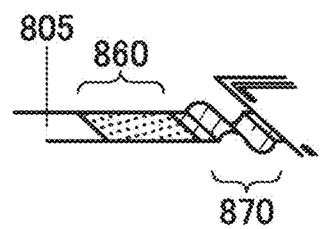
Figure 17D:
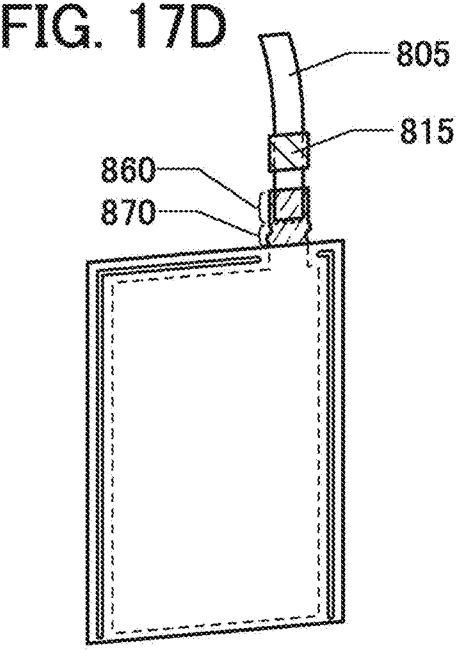

The negative electrode tab and the negative electrode lead 805 are positioned between a first bonding die 851 provided with projections 853 and a second bonding die 852. When ultrasonic welding is performed with a region that is to be connected overlapping with the projections 853, a connection region 860 and a bent portion 870 are formed in the negative electrode tab. FIG. 17C is an enlarged perspective view showing the connection region 860 and the bent portion 870 of the negative electrode tab.

This bent portion 870 can relieve stress due to external force applied after fabrication of the power storage unit 800. Thus, the power storage unit 800 can have high reliability.

Furthermore, the ultrasonic welding apparatus including the bonding dies illustrated in FIG. 17B can perform ultrasonic welding and form the bent portion 870 at a time; thus, a secondary battery can be fabricated without increasing the number of fabricating steps. Note that ultrasonic welding and forming the bent portion 870 may be separately performed.

The bent portion 870 is not necessarily formed in the negative electrode tab. A high-strength material such as stainless steel may be used for a negative electrode current collector and the negative electrode current collector may be formed to have 10 m or less, in order to relieve stress due to external force applied after fabrication of a secondary battery.

It is needless to say that two or more of the above examples may be combined to relieve concentration of stress in the negative electrode tab.

The example of fabricating the negative electrode is described here, and the positive electrode can be fabricated in a manner similar to that of the negative electrode.

3. Connecting Positive Electrode Lead to Positive Electrode Tab

Next, the positive electrode lead 804 including the sealing layer 815 is electrically connected to a positive electrode tab of the positive electrode current collector 801*a* in a manner similar to that of connecting the negative electrode tab and the negative electrode lead 805. The positive electrode lead 804 and the negative electrode lead 805 are preferably formed using different materials.

4. Covering Positive Electrode and Negative Electrode with Exterior Body

Figure 18B:
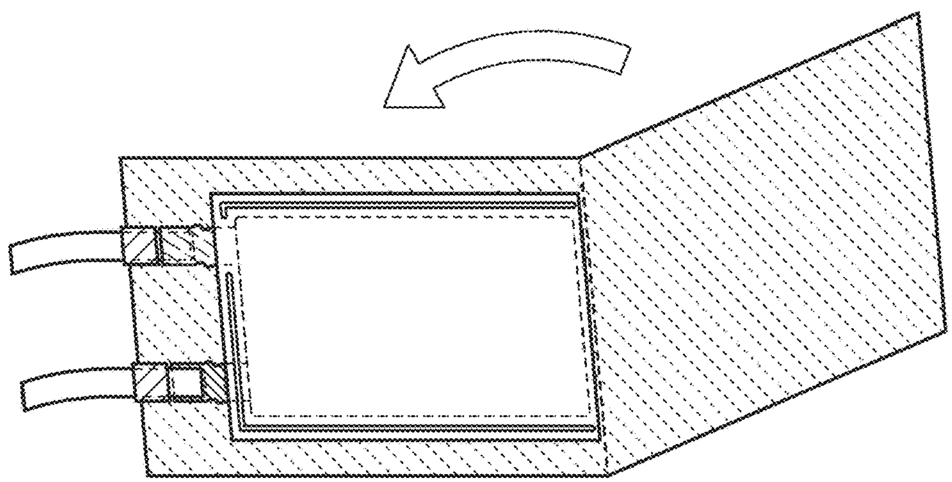
FIGS. 18A and 18B illustrate a fabricating process of a power storage unit.
Figure 18A:
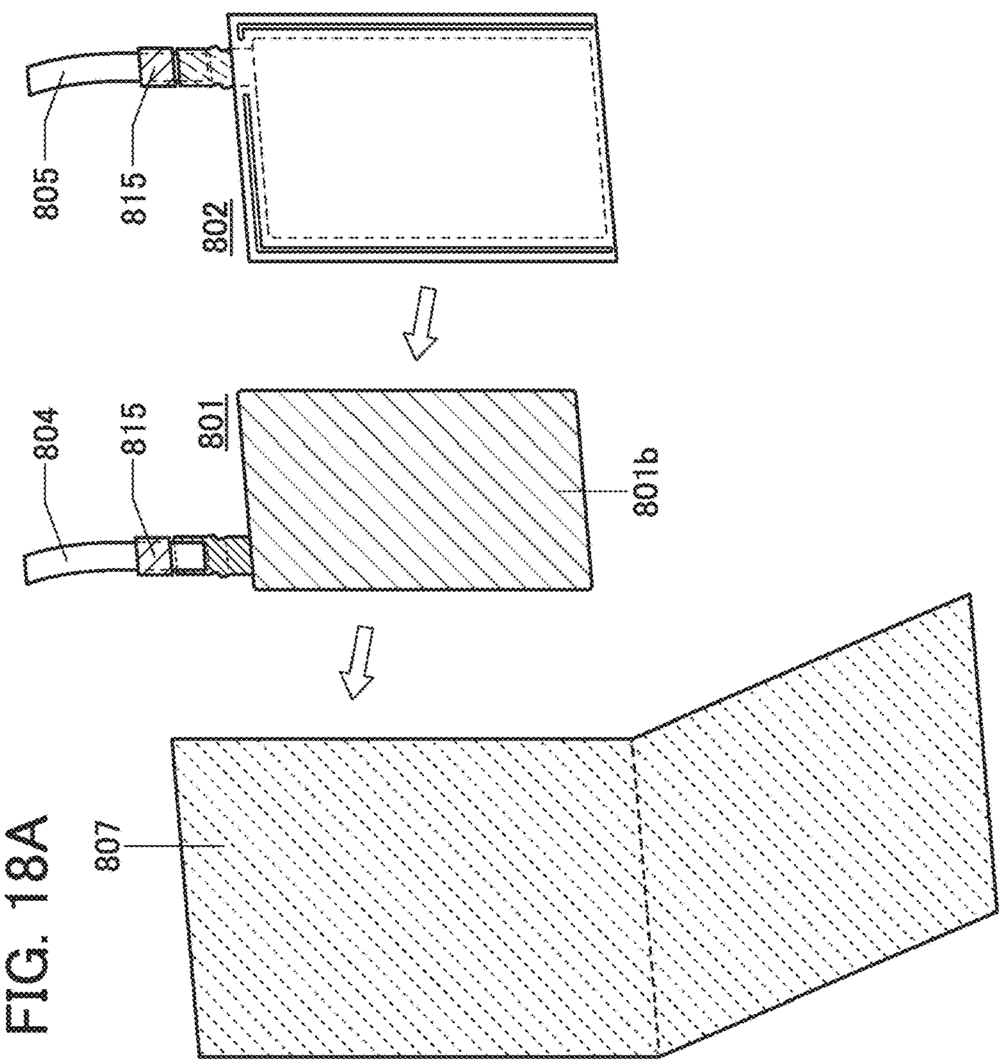

Next, the positive electrode 801 and the negative electrode 802 covered with the envelope 803 are stacked over the exterior body 807 such that the positive electrode active material layer 801*b* and the negative electrode active material layer 802*b* face each other (see FIG. 18A).

Figure 19A:
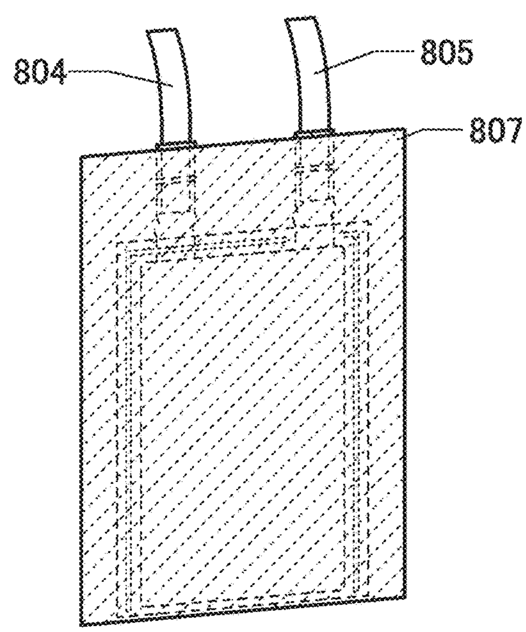
FIGS. 19A to 19C illustrate a fabricating process of a power storage unit.

Then, the exterior body 807 is folded along a dotted line in the vicinity of the center of the exterior body 807 in FIG. 18A (see FIG. 18B) so as to be in the state illustrated in FIG. 19A.

5. Introducing Electrolytic Solution into Region Surrounded by Exterior Body

Figure 19B:
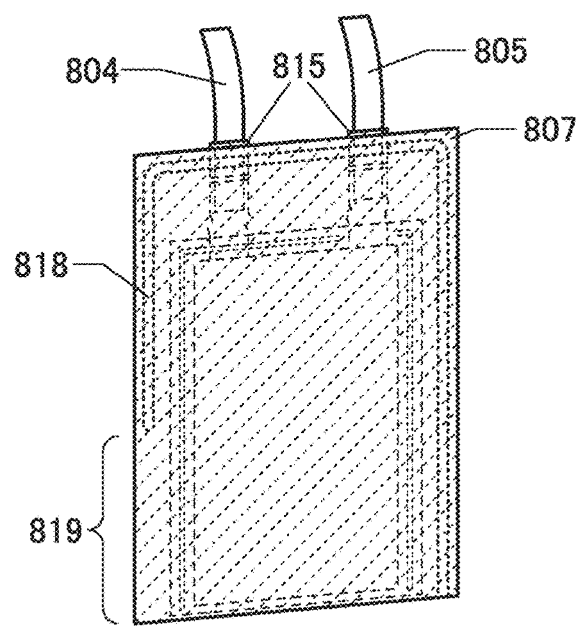

The outer edges of the exterior body 807 except an inlet 819 for introducing the electrolytic solution 806 are bonded by thermocompression bonding. In thermocompression bonding, the sealing layers 815 provided over the lead electrodes are also melted, thereby fixing the lead electrodes and the exterior body 807 to each other. In FIG. 19B, the thermocompression bonding portion in the outer edges of the exterior body 807 is illustrated as a bonding portion 818.

Figure 19C:
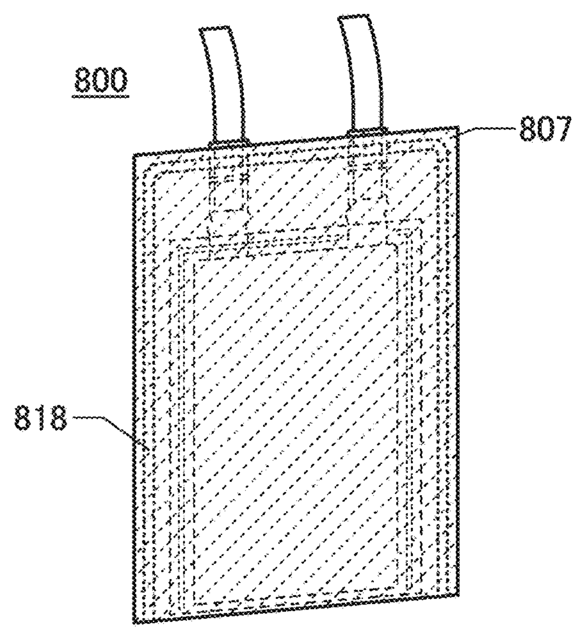

After that, in a reduced-pressure atmosphere or an inert gas atmosphere, a desired amount of electrolytic solution is introduced to the inside of the exterior body 807 from the inlet 819. Lastly, the inlet 819 is sealed by thermocompression bonding. Through the above steps, the power storage unit 800 can be fabricated (see FIG. 19C).

6. Modification Example

Figure 20B:
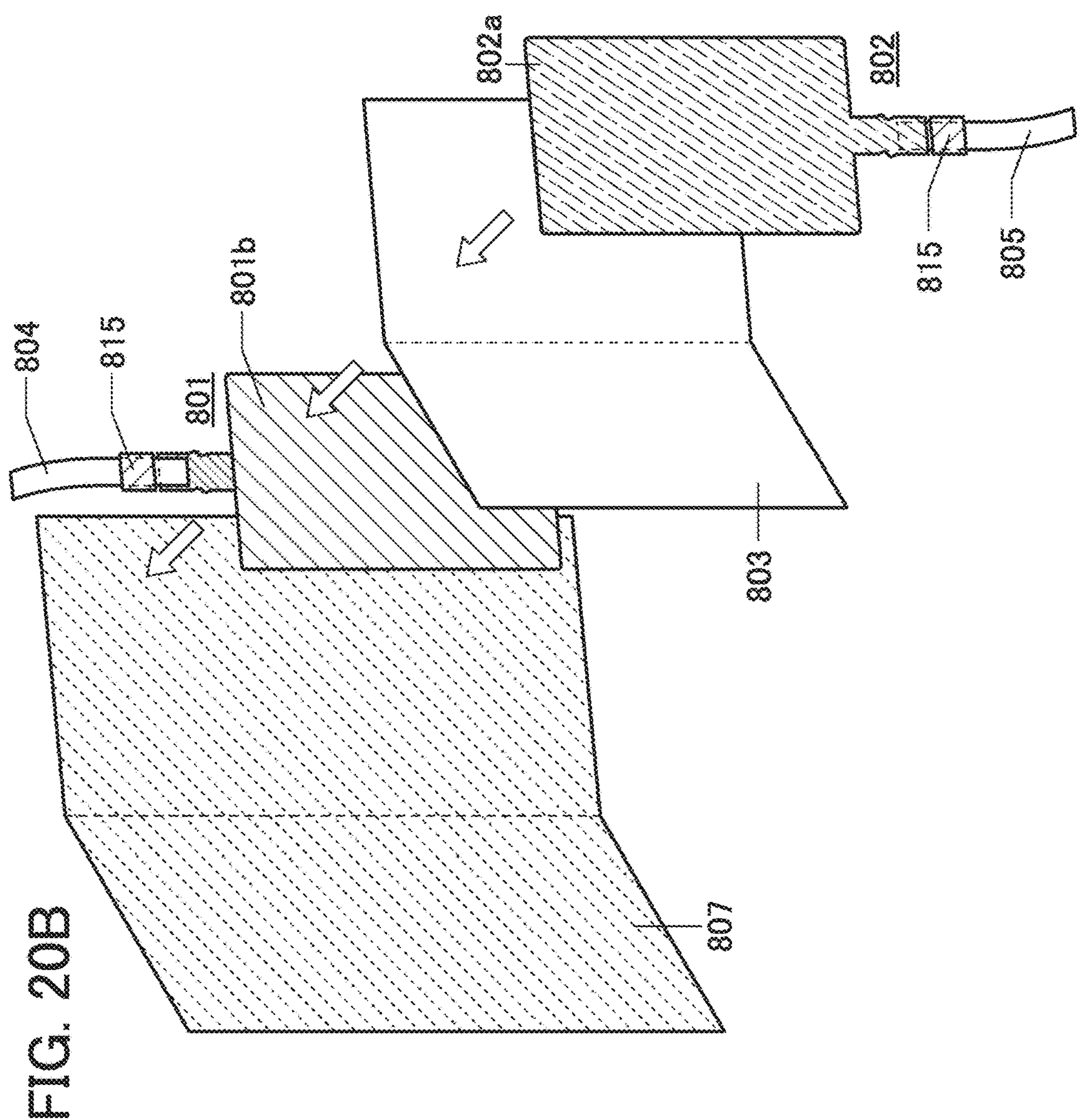
FIGS. 20A and 20B illustrate a fabricating process of a power storage unit.
Figure 20A:
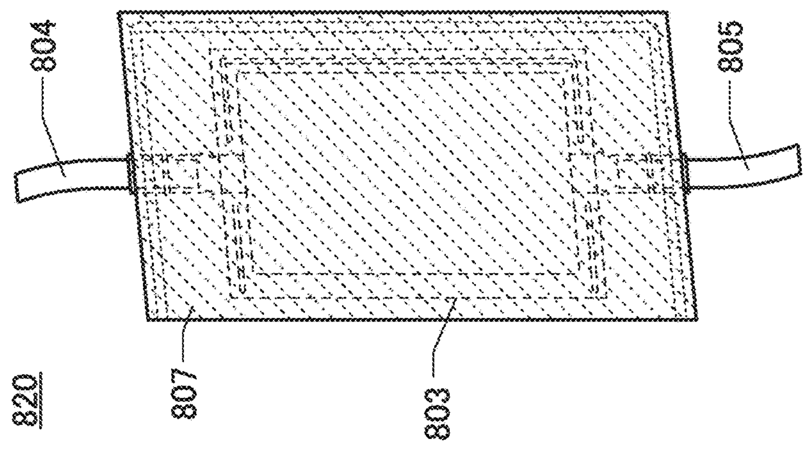

FIG. 20A illustrates a power storage unit 820 as a modification example of the power storage unit 800. The power storage unit 820 illustrated in FIG. 20A is different from the power storage unit 800 in arrangement of the positive electrode lead 804 and the negative electrode lead 805. Specifically, in the power storage unit 800, the positive electrode lead 804 and the negative electrode lead 805 are arranged on the same side of the exterior body 807, whereas in the power storage unit 820, the positive electrode lead 804 and the negative electrode lead 805 are arranged on different sides of the exterior body 807. Since lead electrodes can be freely arranged in such a manner, the power storage unit of one embodiment of the present invention has high design flexibility. This can increase the design flexibility of a product using the power storage unit of one embodiment of the present invention. Furthermore, the productivity of a product using the power storage unit of one embodiment of the present invention can be increased.

FIG. 20B illustrates a fabricating process of the power storage unit 820. The power storage unit 820 can be fabricated using materials and methods similar to those of the power storage unit 800; thus, detailed descriptions thereof are omitted here. Note that the electrolytic solution 806 is not illustrated in FIG. 20B.

Pressing (e.g., embossing) may be performed to form unevenness in advance on a surface of a film used as the exterior body 807. The unevenness on the surface of the film increases flexibility of a secondary battery and further relieves stress. The depressions or projections of a front surface (or a back surface) of the film formed by embossing form an obstructed space that is sealed by the film serving as a part of a wall of the sealing structure and whose inner volume is variable. This obstructed space can also be said to be formed because the depressions or projections of the film have an accordion structure (bellows structure). Note that embossing, which is a kind of pressing, is not necessarily employed and any method that allows formation of a relief on part of the film is employed.

Although the envelope is used in this embodiment, a separator can alternatively be used.

This embodiment can be implemented in combination with any of the other embodiments and the example as appropriate. For example, the power storage unit 800 or the power storage unit 820 can be used as the secondary battery 601 described in Embodiment 1. Furthermore, the power storage unit 800 or the power storage unit 820 can be used as the secondary battery 505 described in Embodiment 2.

Example 1

Figures 21A, 21B:
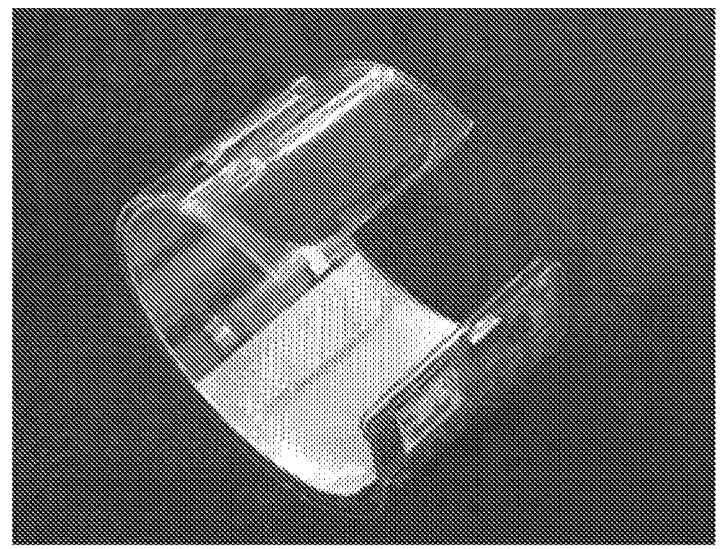
FIGS. 21A and 21B are external photographs of an example of a novel device.

FIG. 21A is a photograph of the appearance of a fabricated novel device worn on an upper arm in this example. FIG. 21B is a photograph of the appearance of the novel device removed from an arm that is taken from the different direction.

The novel device illustrated in FIGS. 21A and 21B includes a 3.4-inch QHD (540×960×RGB) display panel, and is an organic EL display device that has a nonvolatile display data retention function and performs display by two driving methods. One of the driving methods is a conventional driving method of a display screen, that is, a driving method of rewriting data for each frame. This method is called “normal driving”. The other is a driving method in which data rewriting is stopped after data write processing is executed. This method is called “idling stop (IDS) driving”. The novel device has an image communication function conforming to Bluetooth (registered trademark) standards and switches display images by image data externally transmitted at intervals of 10 seconds. A display image is maintained by IDS driving for 10 seconds until the display image is changed to another display image.

The organic EL display device is an active matrix display device that uses, as a switching element, a transistor including an oxide semiconductor (IGZO). The transistor including IGZO that has a significantly low off-state current and low power consumption is used to efficiently utilize idling stop driving, whereby power consumption can be reduced while maintaining high resolution display.

The novel device illustrated in FIGS. 21A and 21B further includes a bendable secondary battery. The secondary battery is a lithium-ion secondary battery. $LiFePO_4$ and graphite are used as a positive electrode active material and a negative electrode active material, respectively. An organic electrolytic solution containing a lithium salt is used as an electrolytic solution. A layered film including aluminum foil is used as an exterior body and is subjected to embossing to be resistant to deformation. Note that the positive electrode active material is not limited to $LiFePO_4$ and may be $LiCoO_2$.

The lithium-ion secondary battery is provided inside the novel device illustrated in FIGS. 21A and 21B. When the novel device is worn or removed, the display panel, the lithium-ion secondary battery, and a drive substrate are stretched in the flat direction and then returns to an original form with a radius of curvature. In the bending test of the flexible lithium-ion secondary battery, the range of radius of curvature is set on the assumption that the novel device is worn and removed. Table 1 shows the specifications of the fabricated flexible lithium-ion secondary battery.

TABLE 1

| | | |
|---|---|---|
| Voltage | | 3.2 V |
| Capacity | | approximately 300 mAh |
| External dimensions (except for lead portion) | Thickness | 3 mm |
| | Height | 75 mm |
| | Width | 60 mm |
| Mass | | approximately 16 g |

Results of the bending test performed with a radius of curvature of 40 mm will be described. Table 2 shows the details of the bending test.

TABLE 2

| | | |
|---|---|---|
| Bending test | Maximum radius of curvature | 150 mm |
| | Minimum radius of curvature | 40 mm |
| | Bending time | 10 sec. |
| | Temperature for test | 25° C. |

Figure 22:
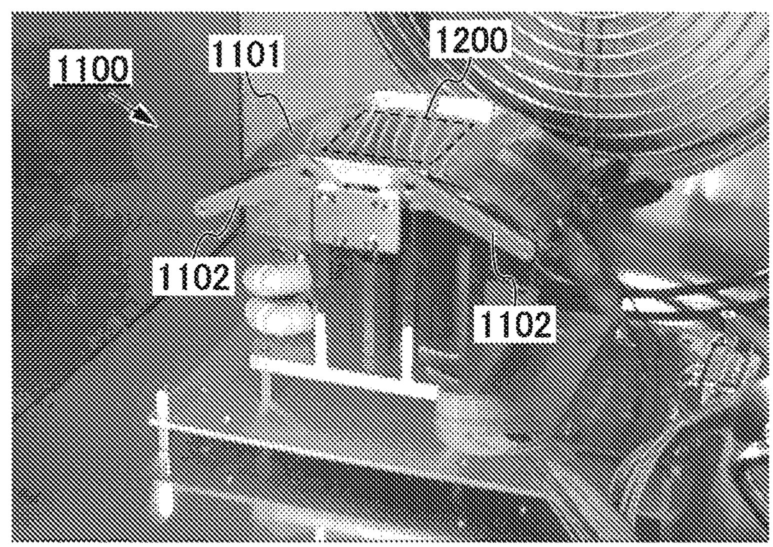
FIG. 22 is an external photograph of a tester.

FIG. 22 is a photograph of the appearance of a tester 1100. A fabricated lithium-ion secondary battery 1200 was placed on the tester 1100. Note that the lithium-ion secondary battery 1200 was sandwiched between two holding plates 1101, and the lithium-ion secondary battery 1200 is shown by a broken line in FIG. 22. The tester 1100 included a cylindrical supporting body (not illustrated) with a radius of curvature of 40 mm extending in the depth direction under the lithium-ion secondary battery 1200 in a center portion. The tester 1100 also included arms 1102 extending in the right and left directions. End portions of the arms 1102 were mechanically connected to the holding plate 1101. By moving the end portions of the arms 1102 up or down, the holding plate 1101 was able to be bent along the supporting body. The bending test of the lithium-ion secondary battery 1200 was performed with the lithium-ion secondary battery 1200 sandwiched between the two holding plates 1101. Thus, moving the end portions of the arms 1102 up or down allowed the lithium-ion secondary battery 1200 to be bent along the cylindrical supporting body. Specifically, lowering the end portions of the arms 1102 permitted the lithium-ion secondary battery 1200 to be bent with a radius of curvature of 40 mm. Since the lithium-ion secondary battery 1200 was bent while being sandwiched between the two holding plates 1101, unnecessary force except bending force was able to be prevented from being applied to the lithium-ion secondary battery 1200. Furthermore, bending force was able to be uniformly applied to the whole lithium-ion secondary battery 1200.

Figure 23:
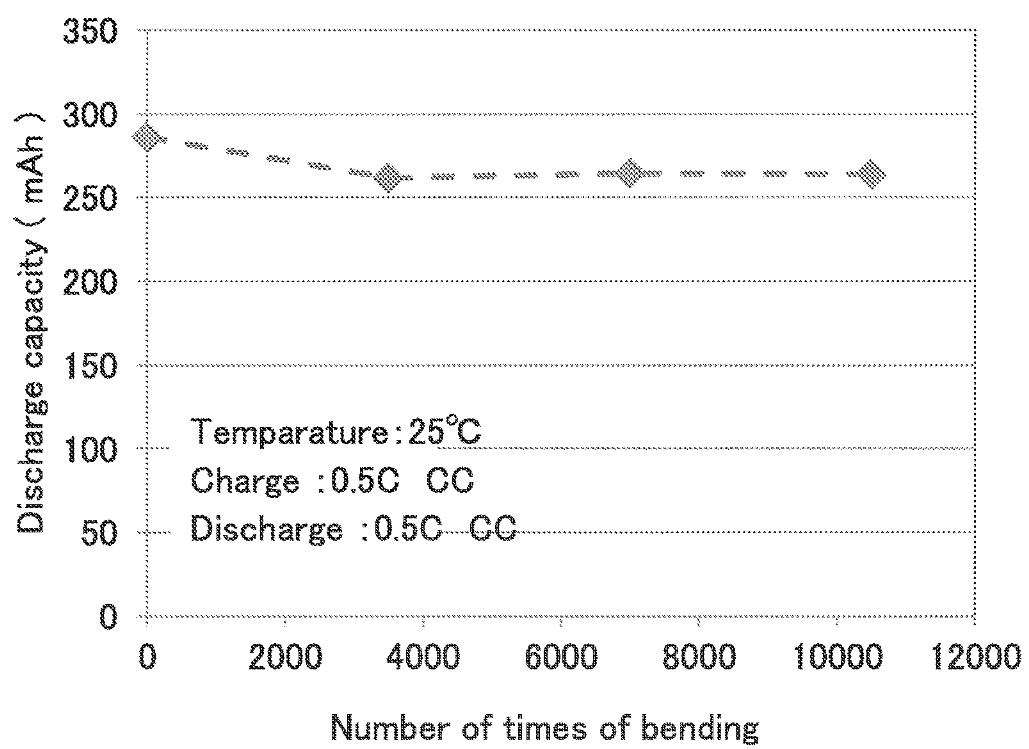
FIG. 23 is a graph showing changes in battery discharge capacity in a repeated bending test.

FIG. 23 is a graph showing test results, where the vertical axis represents discharge capacity and the horizontal axis represents the number of times of bending. Test conditions in FIG. 23 are as follows: the temperature is 25° C., the charge rate is 0.5 C. and the discharge rate is 0.5 C. Here, a charge rate and a discharge rate will be described. For example, in the case of charging a secondary battery with a certain capacity [Ah] at a constant current, a charge rate of 1 C means the current value I [A] with which charging is terminated in exactly 1 h, and a charge rate of 0.2 C means I/5 [A] (i.e., the current value with which charging is terminated in exactly 5 h). Similarly, a discharge rate of 1 C means the current value I [A] with which discharging is ended in exactly 1 h, and a discharge rate of 0.2 C means I/5 [A] (i.e., the current value with which discharging is ended in exactly 5 h). According to the results of the bending test in FIG. 23, the discharge capacity after 10500-time bending was 92% of the initial capacity, which indicates that capacity was able to be maintained.

Figure 24:
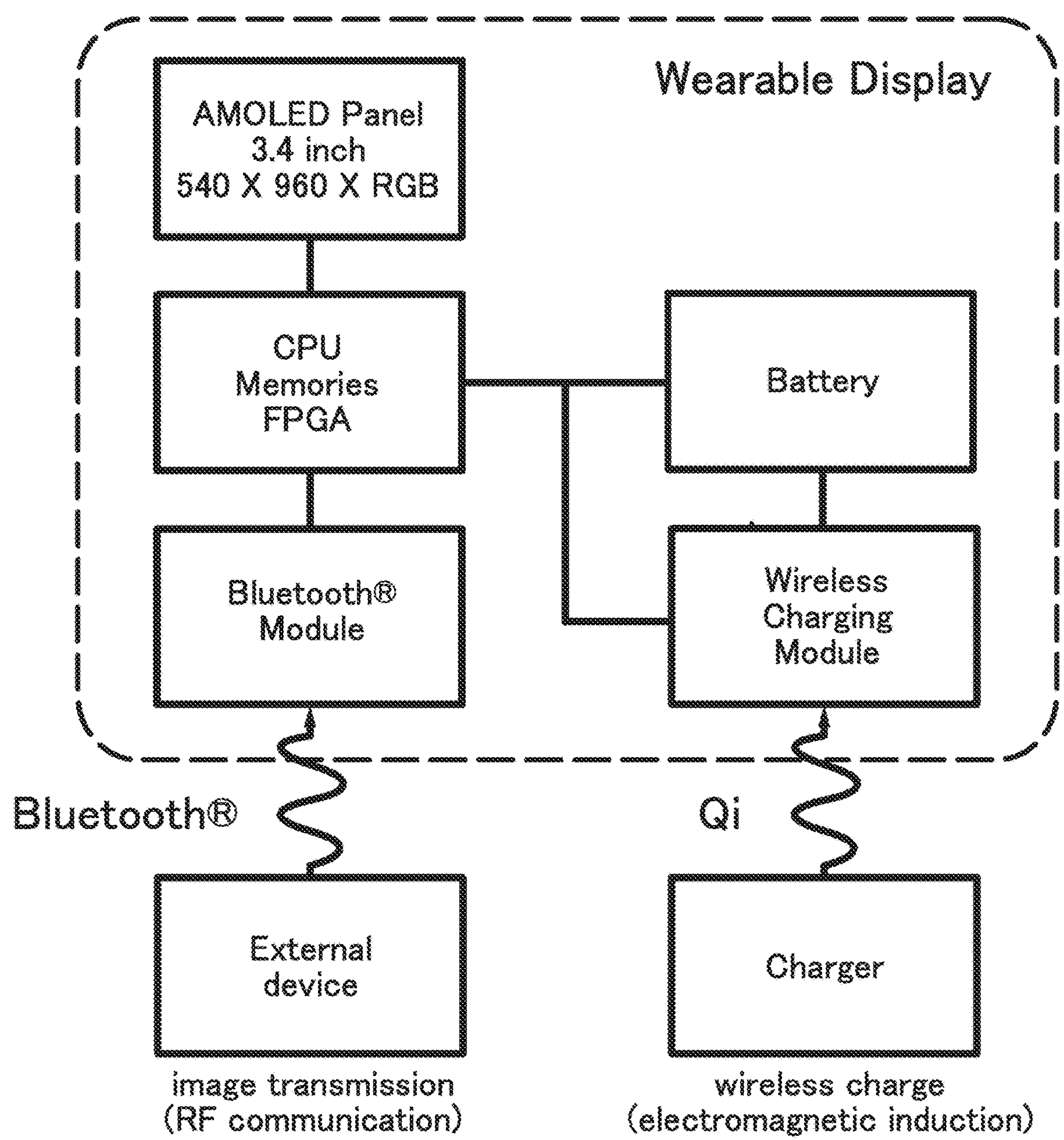
FIG. 24 is a block diagram of a novel device.

The lithium-ion secondary battery in the novel device is charged according to the Qi wireless charging standard, and non-contact charging can be performed using a dedicated charger. FIG. 24 is a block diagram of the novel device. FIG. 24 illustrates a wearable display device including a 3.4-inch active matrix organic EL panel, a CPU, a secondary battery, a wireless charging module having a signal communication function conforming to the Qi standard, and a Bluetooth (registered trademark) module having an image communication function conforming to Bluetooth (registered trademark) standards. In this novel device, the wireless charging module having a signal communication function conforming to the Qi standard can receive a signal from an external charger and the Bluetooth (registered trademark) module can receive an image signal and the like from an external device with the use of an RF signal.

This application is based on Japanese Patent Application serial no. 2013-237417 filed with the Japan Patent Office on Nov. 15, 2013 and Japanese Patent Application serial no. 2013-249047 filed with the Japan Patent Office on Dec. 2, 2013, the entire contents of which are hereby incorporated by reference.

What is claimed is:

1. An electronic device comprising:

a display portion with a first curved surface; and a battery with a second curved surface, the battery including a portion overlapping with the display portion;

a circuit board; and a film including a strip-like leaf spring, the film configured to wind around an arm of a human, wherein the battery comprises a first current collector, a second current collector, a first active material layer, a second active material layer, and an envelope, wherein the battery includes an exterior body including a layered film including an aluminum film, the layered film being embossed, wherein the battery is electrically connected to the circuit board with a terminal, wherein the display portion is electrically connected to the circuit board with an FPC, and wherein the circuit board comprises a charging circuit, a driver circuit, a power supply circuit, and a video signal processing circuit.

2. The electronic device according to claim 1, wherein a radius of curvature of each of the first curved surface and the second curved surface is 30 mm to 70 mm.

3. The electronic device according to claim 1, wherein a first direction in which the display portion curved is different from a second direction in which the battery curved.

4. The electronic device according to claim 1, wherein one end portion of the film overlaps with the other end portion of the film when the film is winding around the arm of the human.

5. The electronic device according to claim 1, wherein the battery is located between the display portion and the film.

6. An electronic device comprising:

a display portion with a first curved surface; and a battery with a second curved surface, the battery including a portion overlapping with the display portion;

a circuit board; and a film including a strip-like leaf spring, the film configured to wind around an arm of a human, wherein the battery comprises a first current collector, a second current collector, a first active material layer, a second active material layer, and an envelope, wherein the battery includes an exterior body including a layered film including an aluminum film, the layered film being embossed, wherein the battery is electrically connected to the circuit board with a terminal, wherein the display portion is electrically connected to the circuit board with an FPC, wherein the circuit board comprises a charging circuit, a driver circuit, a power supply circuit, and a video signal processing circuit, and wherein the display portion comprises a transistor comprising an oxide semiconductor.

7. The electronic device according to claim 6, wherein a radius of curvature of each of the first curved surface and the second curved surface is 30 mm to 70 mm.

8. The electronic device according to claim 6, wherein a first direction in which the display portion curved is different from a second direction in which the battery curved.

9. The electronic device according to claim 6, wherein one end portion of the film overlaps with the other end portion of the film when the film is winding around the arm of the human.

10. The electronic device according to claim 6, wherein the battery is located between the display portion and the film.

* * * * *